United States Patent
El-Lateef Ahmed et al.

(10) Patent No.: US 12,434,987 B1
(45) Date of Patent: Oct. 7, 2025

(54) CARBOXYMETHYL CELLULOSE HYDROGEL LOADED WITH TITANIUM OXIDE NANOPARTICLES FOR WASTEWATER TREATMENT

(71) Applicant: KING FAISAL UNIVERSITY, Al-Ahsa (SA)

(72) Inventors: Hany Mohamed Abd El-Lateef Ahmed, Al-Ahsa (SA); Mai Mostafa Khalaf Ali, Al-Ahsa (SA); Mohamed Gouda, Al-Ahsa (SA); Mohammed Abbas Alsaeed, Al-Ahsa (SA); Fatima Essa Al Rasheed, Al-Ahsa (SA)

(73) Assignee: KING FAISAL UNIVERSITY, Al-Ahsa (SA)

(*) Notice: Subject to any disclaimer, the term of this patent is extended or adjusted under 35 U.S.C. 154(b) by 0 days.

(21) Appl. No.: 19/015,470

(22) Filed: Jan. 9, 2025

(51) Int. Cl.
| | |
|---|---|
| *C08B 11/12* | (2006.01) |
| *B01J 21/06* | (2006.01) |
| *B01J 35/39* | (2024.01) |
| *B01J 35/45* | (2024.01) |
| *B01J 37/08* | (2006.01) |
| *B01J 37/12* | (2006.01) |
| *C02F 1/32* | (2023.01) |
| *C02F 1/72* | (2023.01) |

(52) U.S. Cl.
CPC ............ *C02F 1/725* (2013.01); *B01J 21/063* (2013.01); *B01J 35/39* (2024.01); *B01J 35/45* (2024.01); *B01J 37/08* (2013.01); *B01J 37/12* (2013.01); *C02F 1/32* (2013.01); *C08B 11/12* (2013.01); *C02F 2305/10* (2013.01)

(58) Field of Classification Search
CPC ................................ B01J 35/45; B01J 21/063
See application file for complete search history.

(56) References Cited

FOREIGN PATENT DOCUMENTS

| | | |
|---|---|---|
| CN | 113444265 A | 9/2021 |
| CN | 115138345 A | 10/2022 |
| KR | 20220033018 A | 3/2022 |

OTHER PUBLICATIONS

Mohsin Raza et. al., Isolation and Characterization of Cellulose Nanocrystals from Date Palm Waste, https://pubs.acs.org/doi/10.1021/acsomega.2c02333 (Year: 2022).*

(Continued)

*Primary Examiner* — Youngsul Jeong
*Assistant Examiner* — Fidan Bersin
(74) *Attorney, Agent, or Firm* — Nath, Goldberg & Meyer; Joshua B. Goldberg

(57) ABSTRACT

A carboxymethyl cellulose hydrogel loaded with $TiO_2$ nanoparticles for wastewater treatment is provided. The $TiO_2NPs$@CMC hydrogel is made by a method including providing raw date fiber, bleaching the raw date fiber, delignifying the bleached raw date fiber, and then performing alkalization and etherification on the bleached raw date fiber to produce date derived CMC; followed by dissolving the CMC in calcium chloride to form a paste-like solution, adding $TiO_2NPs$ to the paste-like solution, and freeze-drying the paste-like solution to obtain the $TiO_2NPs$@CMC hydrogel. The $TiO_2NPs$@CMC hydrogel is effective for degrading pathogens contaminating wastewater and preventing biofilm formation in wastewater systems.

18 Claims, 17 Drawing Sheets

(56) References Cited

OTHER PUBLICATIONS

Mohamed Gouda et. al., Facile fabrication and characterization of carboxymethyl cellulose hydrogel loaded with TiO2NPs as a promising disinfectant for eliminating the dissemination of waterborne pathogens through wastewater decontamination (Year: 2024).*

Isolation and Characterization of Cellulose Nanocrystals from Date Palm Waste, Raza et. al., 2022 (Year: 2022).*

Carboxymethyl Cellulose Hydrogel from Biomass Waste of Oil Palm Empty Fruit Bunch Using Calcium Chloride as Crosslinking Agent, Tuan et. al., 2021 (Year: 2021).*

Preparation of a hydroxyethyl-titanium dioxide-carboxymethyl cellulose hydrogel cage and its effect on the removal of methylene blue, Han et. al., 2017 (Year: 2017).*

Hendy, A.A., et al., "Implementation of Carboxymethyl Cellulose/ Acrylic acid/ Titanium Dioxide Nanocomposite Hydrogel in Remediation of Cd(II), Zn(II) and Pb(II) for Water Treatment Application," Egypt J. Chem. 62(10): (2019).

Han, S., et al., "Preparation of a hydroxyethyl-titanium dioxide-carboxymethyl cellulose hydrogel cage and its effect on the removal of methylene blue," J. Applied Polymer Science 134: 44925 (2017). Abstract.

Elmehbad, N. Y., et al., "Synthesis of Novel Antimicrobial and Food-Preserving Hydrogel Nanocomposite Films Based on Carboxymethylcellulose," Starch 76(7-8): 2300258 (Jul. 2024). Abstract.

Suriyatem, R., et al., "Physical Properties of Carboxymethyl Cellulose from Palm Bunch and Bagasse Agricultural Wastes: Effect of Delignification with Hydrogen Peroxide," Polymers 12(7): 1505 (2020).

Ramezanzade, V., et al., "Investigation study of methyl violet photodegradation over alginate-carboxymethyl cellulose/ titanium(IV) oxide/covalent organic frameworks bio-nanocomposite beads under ultraviolet irradiation," Int. J. Biological Macromolecules 277(3): 134287 (Oct. 2024).

Alsulami, Q.A. et al., "Synthesis of the SWCNTs/TiO2 nanostructure and its effect study on the thermal, optical, and conductivity properties of the CMC/PEO blend," Results Phys. 28: 104675 (2021).

Nan, N.F.C., et al., "Preparation and Swelling Study of CMC Hydrogel as Potential Superabsorbent," Pertanika J. Sci. Technol. 27 (2019).

* cited by examiner

CARBOXYMETHYL CELLULOSE HYDROGEL LOADED WITH TITANIUM OXIDE NANOPARTICLES FOR WASTEWATER TREATMENT

BACKGROUND

Field

The disclosure of the present patent application relates to wastewater treatment and particularly to a carboxymethyl cellulose hydrogel loaded with $TiO_2$ nanoparticles for wastewater treatment.

Description of Related Art

Water is an essential resource for human lives and welfare and pollution poses great risk to the health and sustainability of the environment. Contaminants such as chemical toxins and pathogenic microbes can enter drinking water through industrial runoff, agricultural runoff, poor waste disposal, unsafe sanitation practices, and the like. Accordingly, it is imperative to societal development to address health-related issues at the national, regional, and local levels in order to guarantee access to clean drinking water. Numerous nations, particularly low-income nations, face the risk of regularly using water that is hazardous for human consumption, which is mainly responsible for an upsurge in waterborne infections. Industrialization and urbanization increase the risk of contamination and the consumption of contaminated water due to their inability to provide satisfactory treatment. Regular use of potentially contaminated water supplies without strict sanitation management expands the risk of contamination in rural areas. The concern caused by anthropogenic contamination of water resources is mainly fecal contamination. Thus, regulatory compliance often focuses on total and fecal coliforms and some protozoa. Contaminated water is deemed to be responsible for significant kinds of waterborne diseases and is considered the main reason for about 52,000,000 deaths throughout the world annually. Bacterial pathogens (including *Shigella dysenteriae, Vibrio cholera*, bacteria belonging to the genus *Legionella, Escherichia coli* O157:H7, and *Campylobacter jejuni*) in drinking water supplies cause one of the greatest threats to public health. The problem of the occurrence of pathogens in drinking water is further complicated by concerns about the distribution of antibiotic-resistant bacteria, which may greatly affect the public. Bacterial resistance to antibiotics and water disinfectants threatens human health, leading to severe economic concerns.

Microbial biofilms are a primary concern associated with water distribution systems, as they affect infrastructure, pollute water, and threaten public health. Biofilms are multicellular communities of microorganisms that attach to water-bearing surfaces and synthesize an extracellular polymeric substance (EPS) matrix by self-assembly. Besides chemicals that induce biofilm formation, the amount of organic matter and nutrition accessibility are other important factors. After implantation in the water system, biofilms can rapidly disseminate and colonize exposed surfaces, including pipes and fittings. Various problems can be caused by microbial biofilms in water systems. Corrosion of infrastructure components reduced the flow rates, while increased pressure differentials are all the results of their function in biofouling. Biofilms also provide a reservoir for harmful bacteria, protozoa and viruses, thereby posing a risk of waterborne disease outbreaks. Disinfection for sanitation applications involves inactivating different microorganisms, including viruses, bacteria, algae, fungi, protozoa, and helminth eggs. Additionally, since multiple groups may coexist simultaneously, disinfection processes should not focus on the prevalence of infection by a single group. Many disinfectants have been identified; the most widely used disinfectants for inactivating pathogens in the water include chloramines, chlorine, chlorine dioxide, ozone, and chlorine gas due to their effectiveness. However, there are known drawbacks to these traditional water disinfection methods, including reactivity with various components in natural water to form disinfection byproducts, typically carcinogens.

Hydrogels are networks formed by bonding hydrophilic polymers through physical or chemical links, resulting in a three-dimensional structure. Due to their structure, hydrogels can hold onto water molecules, resulting in no effect on their mechanical properties. Due to this characteristic, hydrogels are used to treat water. Their porous nature makes them good nanoparticle carriers as they permit controlled release. In general, hydrogels possess these properties, which make them applicable in different areas, e.g., biomedicine and purification of water. In addition, there has been a lot of attention on hydrogels for wastewater treatment because they are made from cellulose and its' derivatives like carboxymethyl cellulose (CMC) which is one of the most commonly occurring natural polymers. Progress in nanoscience and nanotechnology has resulted in more antibacterial additives being incorporated into cellulose-based hydrogels, thus leading to the enhanced antibacterial properties of such hydrogels over and above those levels achieved by metal nanoparticles in combination with these hydrogels. Among metal oxides which have been used to improve cellulose-based hydrogel properties, titanium oxide nanoparticles ($TiO_2NPs$) have been added to composite hydrogels and have been observed to provide unique antibacterial properties. Through the combination of metal oxides, the hydrogel's structure is strengthened by raising its network density. Hence, introducing metal oxides increases cellulose-based hydrogels' antibacterial performance. $TiO_2NPs$ are a prevalent photocatalytic agent used for destroying pathogenic bacterial cells in water. Among the features that make $TiO_2NPs$ attractive are their chemical stability, non-toxicity, and low cost; instead, the most influential is the photocatalytic activity employed in their manufacture, which produces reactive oxygen species (ROS).

Thus, a carboxymethyl cellulose hydrogel loaded with $TiO_2$ nanoparticles for wastewater treatment solving the aforementioned problems is desired.

SUMMARY

A carboxymethyl cellulose (CMC) hydrogel loaded with $TiO_2$ nanoparticles ($TiO_2NPs$) for wastewater treatment is provided. The $TiO_2NPs$@CMC hydrogel is made by a method including providing raw date fiber, bleaching the raw date fiber, delignifying the bleached raw date fiber, and then performing alkalization and etherification on the bleached raw date fiber to produce date derived CMC; followed by dissolving the CMC in calcium chloride to form a paste-like solution, adding $TiO_2NPs$ to the paste-like solution, and freeze-drying the paste-like solution to obtain the $TiO_2NPs$@CMC hydrogel.

In a further embodiment, the $TiO_2NPs$ may be produced by a method including hydrolysis and peptization. The hydrolysis step includes adding titanium isopropoxide (TIPP) to nitric acid ($HNO_3$) in a dropwise fashion under constant stirring to obtain a white precipitate. A slurry comprising the white precipitate may then be heated to 80° C. with mechanical stirring for about 12 hours (peptization). The slurry is then centrifuged, dried, and calcined to obtain the $TiO_2NPs$.

In a further embodiment, a method of wastewater treatment is provided comprising making a $TiO_2NPs$@CMC hydrogel according to the methods disclosed herein and administering the $TiO_2NPs$@CMC hydrogel to wastewater at a concentration between about 5 mg/mL and about 45 mg/mL. In a preferred embodiment, the $TiO_2NPs$@CMC hydrogel may be administered to wastewater in a concentration of about 45 mg/mL to provide broad spectrum inhibition of biofilm formation, including inhibiting formation of biofilms by gram positive bacteria, gram negative bacteria, and fungi.

In a further embodiment, a method of disinfecting wastewater is provided comprising making a $TiO_2NPs$@CMC hydrogel according to the methods disclosed herein and administering the $TiO_2NPs$@CMC hydrogel to wastewater. In a preferred embodiment, the $TiO_2NPs$@CMC hydrogel may be administered to wastewater in a concentration of about 2×MIC for the particular contaminant in need of removal.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1A:
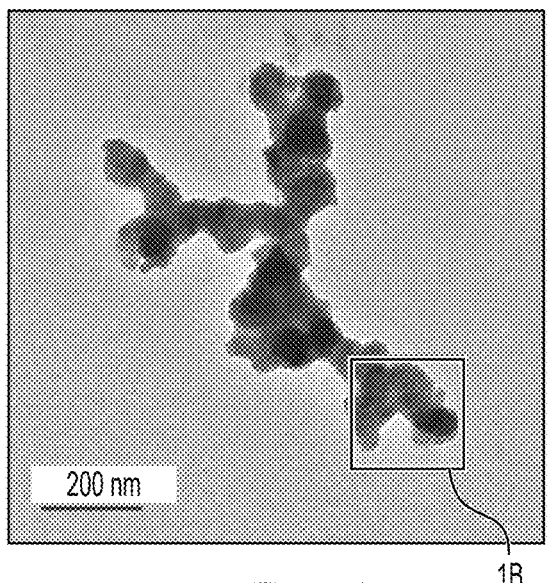
FIG. 1A depicts a Transmission Electron Micrograph of $TiO_2NPs$ synthesized according to the present methods.

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

A carboxymethyl cellulose (CMC) hydrogel loaded with $TiO_2$ nanoparticles ($TiO_2NPs$) for wastewater treatment is provided. The $TiO_2NPs$@CMC hydrogel is made by a method including providing raw date fiber, bleaching the raw date fiber, delignifying the bleached raw date fiber, and then performing alkalization and etherification on the bleached raw date fiber to produce date derived CMC; followed by dissolving the CMC in calcium chloride to form a paste-like solution, adding $TiO_2NPs$ to the paste-like solution, and freeze-drying the paste-like solution to obtain the $TiO_2NPs$@CMC hydrogel.

In an embodiment, raw date fiber may be bleached using an about 4% $NaClO_2$ solution acidified to a pH of about 3.5-4.0 with 10% v/v glacial acetic acid. The bleaching may be performed under constant stirring at about 80° C. for about 1 hour in an about 1:50 fiber-to-$NaClO_2$ solution ratio and may result in the production of vacuum-filtered bleached fiber. The vacuum-filtered bleached fiber may be washed until the pH of the filtrate reaches about 6.5-7, followed by drying at about 105° C. for about 24 hours. The dried vacuum-filtered bleached fiber may then be delignified with an about 4% NaOH solution at about 25-30° C. for about 30 minutes, using a 1:50 fiber-to-NaOH solution ratio to obtain a delignified sample. The delignified sample may then be filtered, rinsed until the filtrate pH reaches about 6.5-7, and dried at about 105° C. for about 24 hours.

In a further embodiment, the $TiO_2NPs$@CMC hydrogel may be made by dissolving CMC (about 25% w/v) in about 5% (w/v) calcium chloride solution under constant stirring for about 4 hours to obtain a homogenous paste-like solution of CMC-$CaCl_2$). The homogenous paste-like solution may then be placed in a petri dish and stored for about 24 hours to allow cross-linking to complete. The homogenous paste-like solution may then be centrifuged after washing three times with water to remove any residual $CaCl_2$) and to obtain a washed precipitate. About 0.6 g of $TiO_2NPs$ may be added to the washed precipitate and this mixture may be stirred for about 4 hours to obtain a $TiO_2NPs$-CMC-$CaCl_2$) paste. The $TiO_2NPs$-CMC-$CaCl_2$) paste may be stored for about 24 hours, washed, and centrifuged to obtain washed $TiO_2NPs$-CMC-$CaCl_2$) paste. The washed $TiO_2NPs$-CMC-$CaCl_2$) paste may then be refrigerated for about 24 hours and freeze dried for about 48 hours to obtain the $TiO_2NP$@CMC hydrogel.

In a further embodiment, the $TiO_2NPs$ may be produced by a method including hydrolysis and peptization. The hydrolysis step includes adding titanium isopropoxide (TIPP) to nitric acid ($HNO_3$) in a dropwise fashion under constant stirring to obtain a white precipitate. A slurry comprising the white precipitate may then be heated to 80° C. with mechanical stirring for about 12 hours (peptization). The slurry is then centrifuged, dried, and calcined to obtain the $TiO_2NPs$.

In an embodiment, about 100 mL titanium isopropoxide (TIPP) is added to about 300 mL nitric acid ($HNO_3$, 0.1M) dropwise at room temperature under constant stirring to obtain a white precipitate. A slurry comprising the white precipitate is then heated to about 80° C. under mechanical stirring for about 12 hours. The slurry includes the titanium iso-propoxide (TIPP, 100 mL) that was added drop by drop to nitric acid (HNO$_3$, 0.1 M, 300 mL) resulted in white precipitate through a hydrolysis step. Centrifugation is then performed to isolate the precipitate, followed by drying at about 80° C. and calcination at about 500° C. for about 2 hours to obtain TiO$_2$NPs.

In a further embodiment, a method of preventing biofilm formation in wastewater systems is provided comprising making a TiO$_2$NPs@CMC hydrogel according to the methods disclosed herein and administering the TiO$_2$NPs@CMC hydrogel to wastewater at a concentration between about 5 mg/mL and about 45 mg/mL. In a preferred embodiment, the TiO$_2$NPs@CMC hydrogel may be administered to wastewater in a concentration of about 45 mg/mL to provide broad spectrum inhibition of biofilm formation, including inhibiting formation of biofilms by gram positive bacteria, gram negative bacteria, and fungi.

In a further embodiment, a method of disinfecting wastewater is provided comprising making a TiO$_2$NPs@CMC hydrogel according to the methods disclosed herein and administering the TiO$_2$NPs@CMC hydrogel to wastewater. In a preferred embodiment, the TiO$_2$NPs@CMC hydrogel may be administered to wastewater in a concentration of about 2×MIC for the particular contaminant in need of removal.

Nanomaterials are also known to act via photocatalytic degradation of environmental pollutants, including hazardous chemical compounds, bacteria, organic pollutants, industrial effluent, dyes, and metal ions. TiO$_2$NPs have significant photocatalytic activity. Some of the parameters that affect the photocatalytic capability of nanoparticles include crystallite size, crystallography, surface area, sample crystal phase, crystal form (facet and morphology), and dopant concentration.

The carboxymethyl cellulose hydrogel loaded with TiO$_2$ nanoparticles for wastewater treatment may be better understood in view of the following examples.

Example 1

Production of Carboxymethyl Cellulose from Waste Palm Material

Materials. Titanium isopropoxide (95%) was purchased from Alfa, Aesar (Germany). Carboxymethyl cellulose (CMC) was purchased from Merck Co. (Germany). Calcium chloride (CaCl$_2$)) was purchased from Marine Chemicals (India). All other utilized solvents or reagents were of analytical grade.

Methods. Raw Date Fiber ("R-DW") underwent bleaching using a 4% w/v NaClO$_2$ solution acidified to pH 3.5-4 with 10% v/v glacial acetic acid. This solution was stirred at 80° C. for 1 hour in a 1:50 fiber-to-NaClO$_2$ solution ratio, resulting in vacuum-filtered Bleached Fiber ("B-DW") washed until the pH of the filtrate reached 6.5-7, then dried at 105° C. for 24 hours.

Subsequently, B-DW was delignified with a 4% w/v NaOH solution at 25-30° C. for 30 minutes, using a 1:50 fiber-to-NaOH solution ratio. The delignified sample ("D-DW") was filtered, rinsed until the pH reached 6.5-7, and dried at 105° C. for 24 hours.

During the production of CMC, two reaction stages occur: alkalization and etherification. The first reaction stage is the reaction between the cellulose hydroxyl groups with sodium monochloroacetate (NaMCA) in the presence of sodium hydroxide (NaOH) to produce CMC.

Example 2

Preparation of Titanium Oxide Nanoparticles (TiO$_2$NPs)

The preparation of TiO$_2$NPs was achieved through the steps of hydrolysis and peptization. In the hydrolysis step, titanium isopropoxide (TIPP, 100 mL) was added to nitric acid (HNO$_3$, 0.1 M, 300 mL). Under stirring, a TIPP solution was added to a HNO$_3$ solution drop by drop at room temperature. With TIPP addition, white precipitate was formed. At the end, the peptization step was developed by subjecting the formed precipitate slurry to 80° C. with mechanical stirring for 12 hours. The peptization step aimed to disrupt agglomerates and form dispersed nanoparticles in a solution. Finally, a centrifugation step was performed for collecting the precipitate, followed by drying at 80° C. and calcination at 500° C. for 2 hours.

Example 3

Preparation of TiO$_2$NP Loaded CMC Hydrogel

Carboxymethyl cellulose (CMC, 25% (w/v) was dissolved in 5% (w/v) of calcium chloride (CaCl$_2$)) solution and kept under stirring for 4 hours. A homogenous paste-like solution of CMC-CaCl$_2$) was formed. This paste-like solution was placed in a Petri dish and kept for 24 hours for ensuring the crosslinking process. The plates (in Petri dish) with the paste were kept at 37° C. for 24 hours in the incubator. The paste-like solution was then centrifuged to precipitate the paste after washing three times with H$_2$O to remove any undesired and untreated residual CaCl$_2$). 0.6 g of the TiO$_2$NPs (prepared according to Example 2) were added to the CMC-CaCl$_2$ paste and kept under stirring for 4 hours. Then, the paste of TiO$_2$NPs-CMC-CaCl$_2$) was kept for 24 hours at 37° C. in the incubator, followed by washing with bi-distilled water and centrifugation. Finally, the produced pastes of CMC-CaCl$_2$ and TiO$_2$NPs-CMC-CaCl$_2$) were kept in refrigerator for 24 hours and dried via freeze drying for 48 hours. The resulting fine powder of crosslinked CMC and of TiO$_2$NPs loaded CMC hydrogel was labeled as CMC hydrogel and TiO$_2$NPs@CMC hydrogel, respectively.

Example 4

Characterization of TiO$_2$NPs and TiO$_2$NP Loaded CMC Hydrogel

The Particle shape and distribution of TiO$_2$NPs was examined using transmission electron microscope (TEM, JEM, 2100, JEOL, Japan). The functional groups of the CMC and TiO$_2$NPs hydrogels were investigated using Fourier Transform infrared spectroscopy (Bruker ALPHA FTIR). The morphological structure, elemental analysis and elements mapping of CMC and TiO$_2$NPs hydrogels were assessed via scanning electron microscopy (SEM, TES-CAN, Vega 3, Czech Republic) and energy dispersive X-ray spectroscopy (EDX, Bruker, Germany). The degree of swelling of CMC and TiO$_2$NPs@CMC hydrogels was calculated as: Degree of Swelling=$[(W_s-W_d)/W_d]*100$, wherein $W_s$ and $W_d$ are the weight of swollen ($W_s$) and dried ($W_d$) hydrogels, respectively. All experiments were carried out in triplicate or quadruplicate.

Figure 1B:
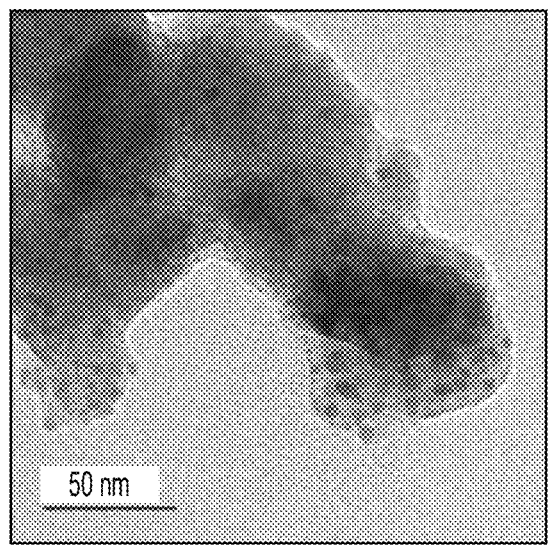
FIG. 1B depicts a higher resolution Transmission Electron Micrograph of the highlighted region of FIG. 1A depicting $TiO_2NPs$ synthesized according to the present methods.

The current work was designed to prepare a hydrogel based on efficient biopolymer such as CMC. To increase the hydrogel efficiency for water treatment, TiO$_2$NPs were added to the CMC. A safe crosslinking agent such as CaCl$_2$)

was used for preparing a 3D hydrogel having significant porous structure and swelling properties. The TiO$_2$NPs were assessed using transmission electron microscopy (TEM). As mentioned in Example 2, for the formation of TiO$_2$NPs with small size and distributed features, a two-step preparation is necessary: hydrolysis and peptization. To confirm the dispersity and the nature of particles, TEM was conducted for the prepared TiO$_2$NPs, the results of which are displayed in FIGS. 1A-1B. As illustrated in FIGS. 1A-1B, the TiO$_2$NPs exhibit both a small size and a remarkable distribution (See particularly the high-resolution TEM illustrated in FIG. 1B).

After the physical characteristics of the TiO$_2$NPs were confirmed, they were blended with CMC and crosslinked with CaCl$_2$) to form TiO$_2$NPs@CMC hydrogels. FTIR was used to confirm the chemical structure of the CMC hydrogels (controls) and of the TiO$_2$NPs@CMC hydrogels, and to evaluate the effect of CaCl$_2$) on the intensity and position of peaks (See FIG. 2). CMC and TiO$_2$NPs@CMC hydrogels were synthesized using calcium chloride as a crosslinking agent. Calcium ions formed chelation and coordination bonds with the negatively charged carboxylate and hydroxyl groups of CMC polymer. However, this approach retarded the formation of hydrogen bonds, therefore, the peak intensity decreased and shifted to lower wavelength.

Figure 2:
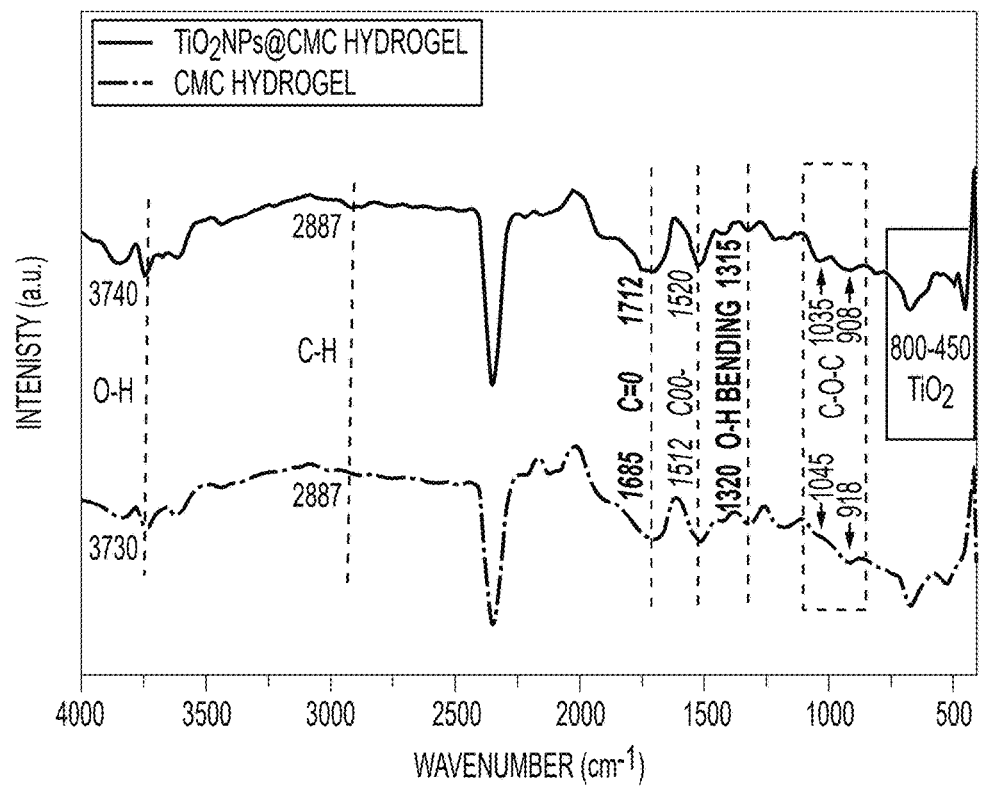
FIG. 2 depicts a Fourier Transform Infrared Micrograph showing results obtained for both CMC hydrogels and $TiO_2NPs$@CMC hydrogels.

In reviewing FIG. 2, it was observed that the peak intensity slightly decreased and moved to lower wavelength confirming the successful crosslinking effect produced by CaCl$_2$). Where the CMC hydrogel exhibited characteristic peaks at 1685, 1512, 1318 cm$^{-1}$ related to stretching vibration of C=O, asymmetric stretching of COO—, and bending mode of hydroxyl groups, respectively. Also, the peaks centered at 3730, 2887 and (1045 and 918) cm$^{-1}$ are distinctive stretching vibration mode of hydroxyl groups, CH$_2$ and ether bond of polysaccharide parts respectively. Addition of TiO$_2$ to CMC hydrogel caused a slight difference in the peaks' position and intensity which was inferred to indicate no actual fundamental changes occurred in the chemical structure of CMC hydrogel. The peaks scanned at the range 450-800 cm$^{-1}$ were correlated to Ti—O—Ti vibration mode. Similar results have been reported previously when titanium dioxide is incorporated into a carboxymethyl cellulose composite film (See Alsulami, Q. A. et al., "Synthesis of the SWCNTs/TiO$_2$ nanostructure and its effect study on the thermal, optical, and conductivity properties of the CMC/PEO blend," Results Phys. 28:104675 (2021)).

Figure 3B:
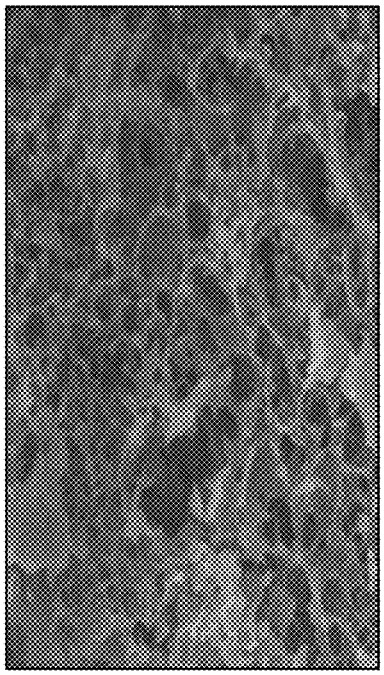
FIG. 3B depicts a scanning electron micrograph of the CMC hydrogels.
Figure 3A:
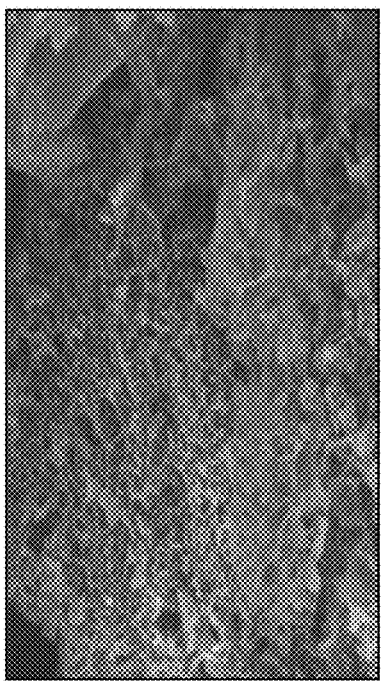
FIG. 3A depicts a scanning electron micrograph of the CMC hydrogels.
Figure 3C:
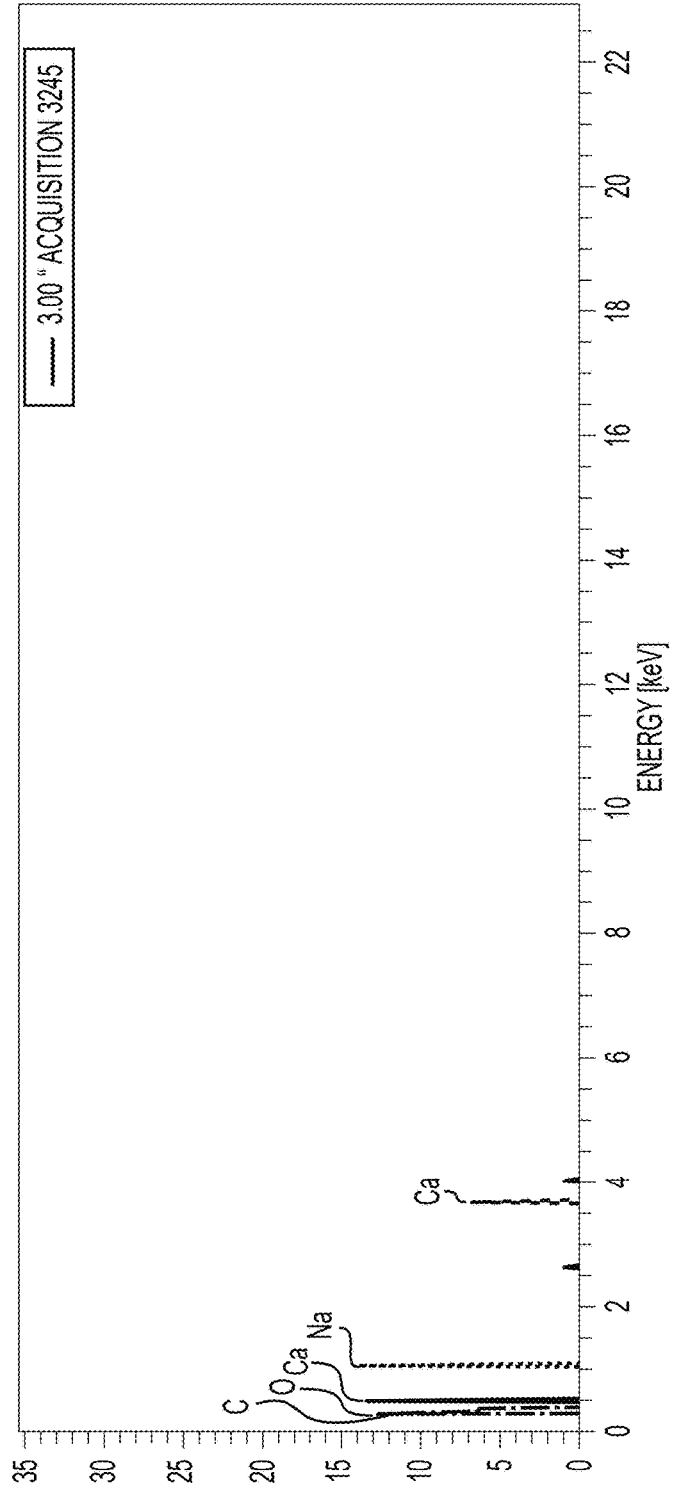
FIG. 3C depicts a graph of element mapping results for the CMC hydrogels.
Figure 3D:
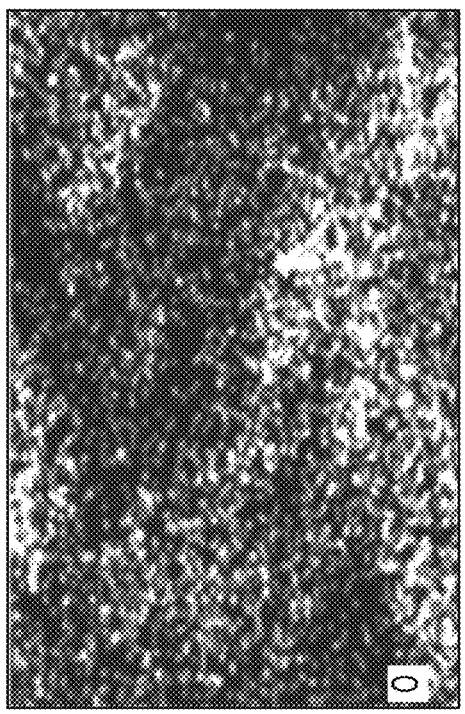
FIG. 3D depicts an energy dispersive X-ray spectrograph and element mapping of the CMC hydrogels.
Figure 3E:
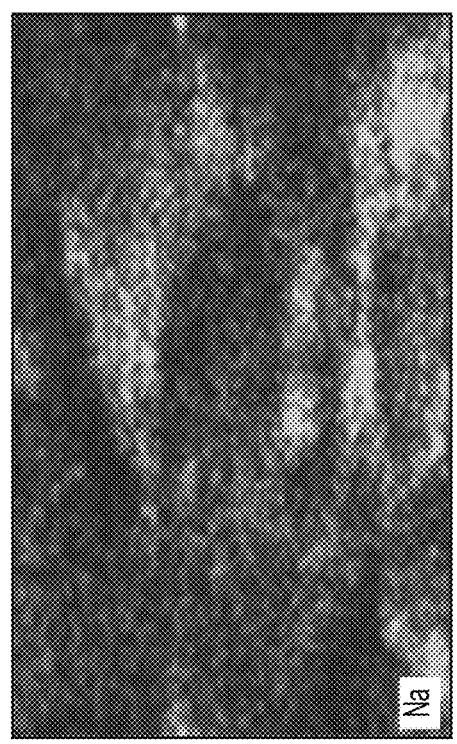
FIG. 3E depicts an energy dispersive X-ray spectrograph and element mapping of the CMC hydrogels.
Figure 3F:
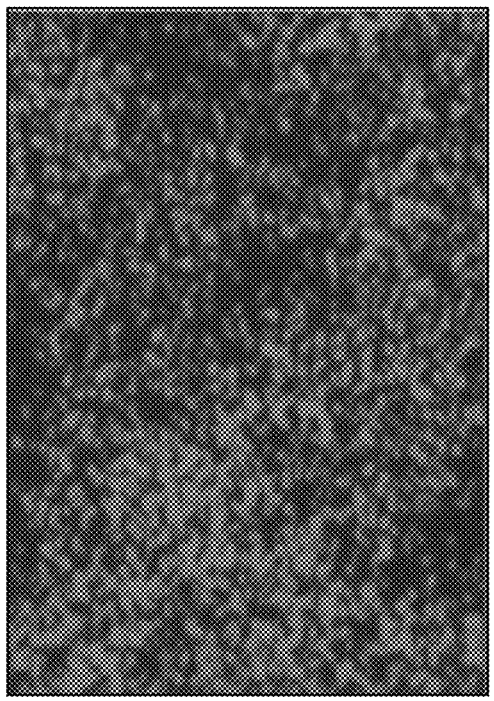
FIG. 3F depicts an energy dispersive X-ray spectrograph and element mapping of the CMC hydrogels.
Figure 3G:
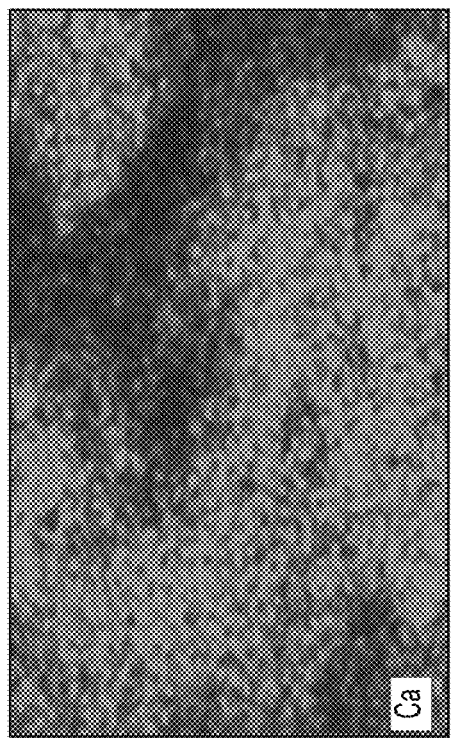
FIG. 3G depicts an energy dispersive X-ray spectrograph and element mapping of the CMC hydrogels.
Figure 4B:
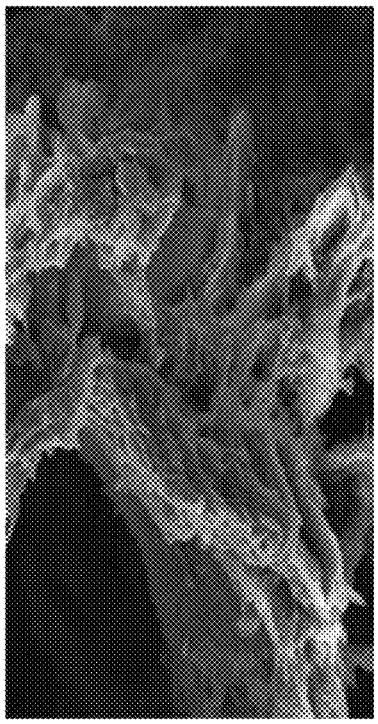
FIG. 4B depicts a scanning electron micrograph of the $TiO_2NPs$@CMC hydrogels.
Figure 4A:
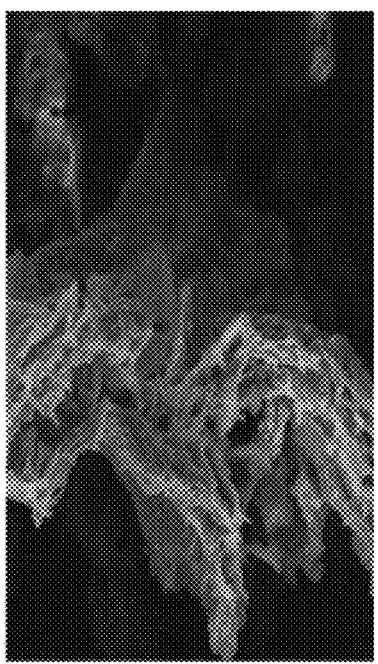
FIG. 4A depicts a scanning electron micrograph of the $TiO_2NPs$@CMC hydrogels.
Figure 4C:
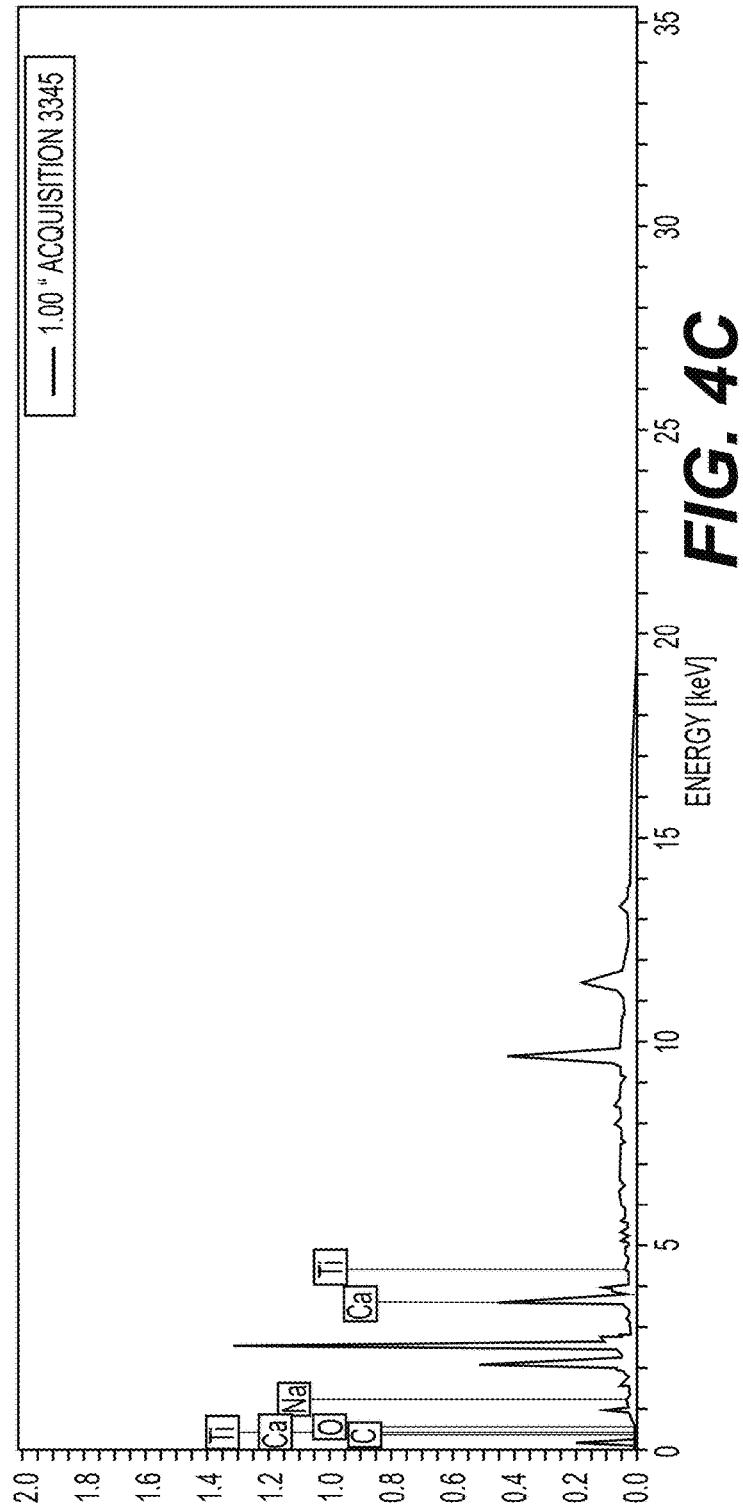
FIG. 4C depicts a graph of element mapping results for the $TiO_2NPs$@CMC hydrogels.
Figure 4D:
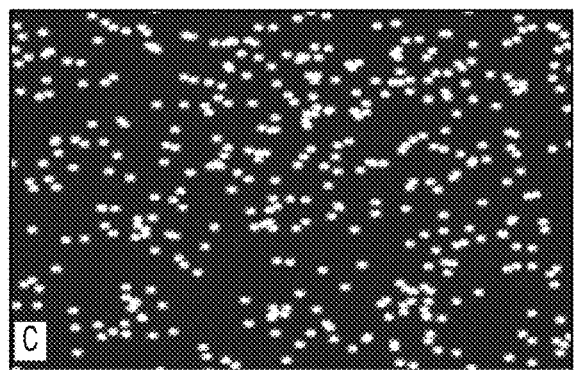
FIG. 4D depicts an energy dispersive X-ray spectrograph and element mapping of the $TiO_2NPs$@CMC hydrogels.
Figure 4E:
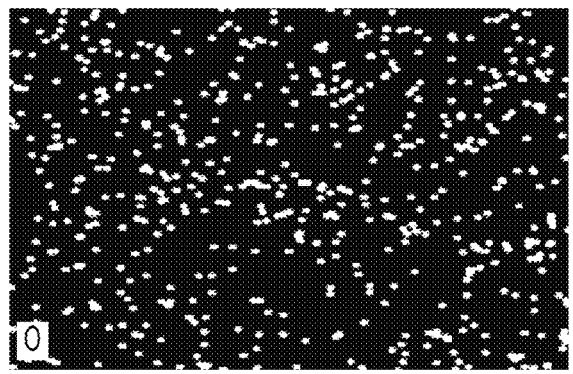
FIG. 4E depicts an energy dispersive X-ray spectrograph and element mapping of the $TiO_2NPs$@CMC hydrogels.
Figure 4F:
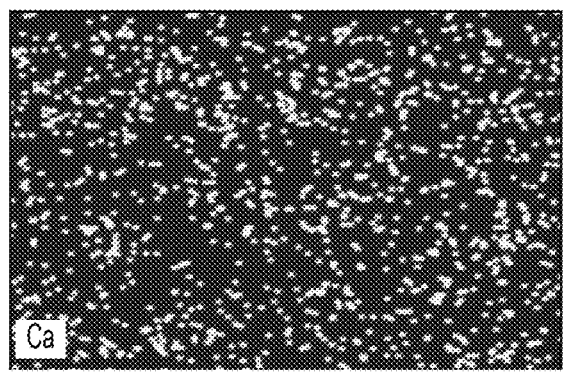
FIG. 4F depicts an energy dispersive X-ray spectrograph and element mapping of the $TiO_2NPs$@CMC hydrogels.
Figure 4G:
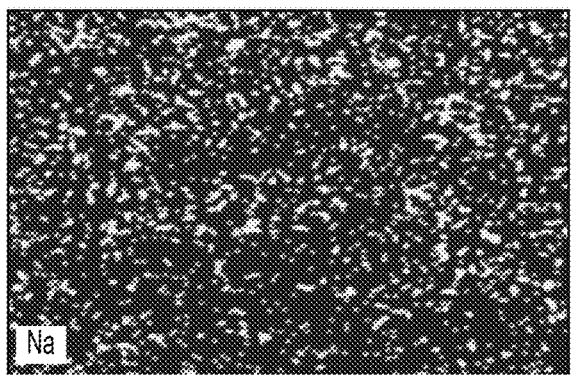
FIG. 4G depicts an energy dispersive X-ray spectrograph and element mapping of the $TiO_2NPs$@CMC hydrogels.
Figure 4H:
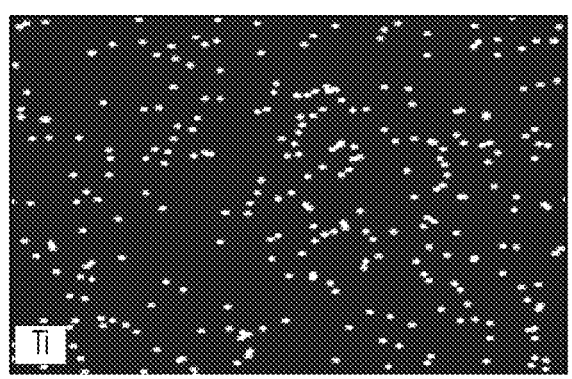
FIG. 4H depicts an energy dispersive X-ray spectrograph and element mapping of the $TiO_2NPs$@CMC hydrogels.

The porous structure affirmed the potential efficiency of CaCl$_2$) as a crosslinking agent. FIGS. 3A-3B depict scanning electron micrographs of the CMC hydrogel. FIGS. 3C-3G depict EDX and element mapping of CMC hydrogel. It was observed from EDX images that there are signs for C, Na, O and Ca. The presence of C, Na and O are mainly attributed to the presence of CMC. Meanwhile, Ca is a result of the presence of crosslinking ion (Ca+2). The mapping of each element was also displayed in FIG. 3C which illustrated the significant and well distributed elements that formed the crosslinked CMC hydrogel. These results are also summarized in Table 1.

TABLE 1

Element Mapping of CMC Hydrogel

| Element | At. No. | Netto | Mass % | Mass Norm. % | Atom % | Abs error % (1 sigma) | Rel. error % (1 sigma) |
|---|---|---|---|---|---|---|---|
| Carbon | 6 | 359 | 5.03 | 31.65 | 44.16 | 1.59 | 31.60 |
| Sodium | 11 | 1572 | 4.62 | 29.06 | 21.18 | 0.38 | 8.19 |

TABLE 1-continued

Element Mapping of CMC Hydrogel

| Element | At. No. | Netto | Mass % | Mass Norm. % | Atom % | Abs error % (1 sigma) | Rel. error % (1 sigma) |
|---|---|---|---|---|---|---|---|
| Oxygen | 8 | 336 | 4.61 | 28.98 | 30.35 | 1.49 | 32.36 |
| Calcium | 20 | 888 | 1.64 | 10.31 | 4.31 | 0.10 | 6.34 |
| | | Sum | 15.90 | 100.00 | 100.00 | | |

When comparing the morphological structure of the CMC hydrogel to the TiO$_2$NPs loaded CMC hydrogel (TiO$_2$NPs@CMC hydrogel) (FIGS. 4A-4H), it was found that many of the empty pores were blocked as a result of most of the TiO$_2$NPs entering these pores. This confirms to some extent the lack of interfacial pores in the TiO$_2$NPs@CMC hydrogel. Despite this, many pores are available and are not blocked, which increases their utility for various industrial applications.

When the resulting EDX and mapping (FIGS. 4C-4H) of the TiO$_2$NPs-containing hydrogel was examined, it was found that the previously discussed elements were present in addition to a new element, Ti. The presence of Ti is attributed to the presence of TiO$_2$NPs in the prepared hydrogel sample. The mapping also clarified the distribution of the crosslinked CMC and TiO$_2$NPs elements that participated in preparing the hydrogel. Overall, the presence of these holes or pores in the hydrogel samples of both CMC and TiO$_2$NPs@CMC can quickly enhanced water absorption. These results are also summarized in Table 2.

TABLE 2

Element Mapping of TiO$_2$NPs@CMC Hydrogel

| Element | At. No. | Netto | Mass % | Mass Norm. % | Atom % | Abs error % (1 sigma) | Rel. error % (1 sigma) |
|---|---|---|---|---|---|---|---|
| Oxygen | 8 | 248 | 2.92 | 37.55 | 47.37 | 1.06 | 36.23 |
| Calcium | 20 | 2893 | 2.42 | 31.06 | 15.64 | 0.11 | 4.68 |
| Sodium | 11 | 240 | 1.47 | 18.94 | 16.63 | 0.19 | 12.88 |
| Carbon | 6 | 146 | 0.93 | 12.00 | 20.17 | 0.43 | 45.73 |
| Titanium | 22 | 23 | 0.03 | 0.44 | 0.19 | 0.01 | 21.51 |
| | | Sum | 1.18 | 100.00 | 100.00 | | |

Degree of Swelling. It has been reported previously that three specific phases lead to the swelling process, including: water molecules diffusing through the matrix, polymer chains relaxing through hydration, and the polymer network expanding as a result of the relaxation. (See Nan, N. F. C., et al., "Preparation and Swelling Study of CMC Hydrogel as Potential Superabsorbent," Pertanika J. Sci. Technol. 27 (2019)) This process took place when CMC hydrogel was immersed in water. It has also been reported that the hydrophilic polymeric chains of the hydrogel produce an osmotic pressure that cause the hydrogel matrix to expand. (See Deghiedy, N. M. A., "Synthesis and Characterization of Super absorbent Hydrogels Based on Natural Polymers Using Ionizing Radiations" National Center for Radiation Research and Technology, Atomic Energy Authority, Cairo (EG), Faculty of Science, Thesis (2004)) It has also been suggested that the hydrophilicity of the carboxylic group in the hydrogels' structure affects their swelling behavior. (See Jamingan, Z., et al., "Sago starch based hydrogel prepared using electron beam irradiation technique for controlled release application," Malaysian J. Anal. Sci. 19: pp. 503-512 (2015))

Figure 5A:
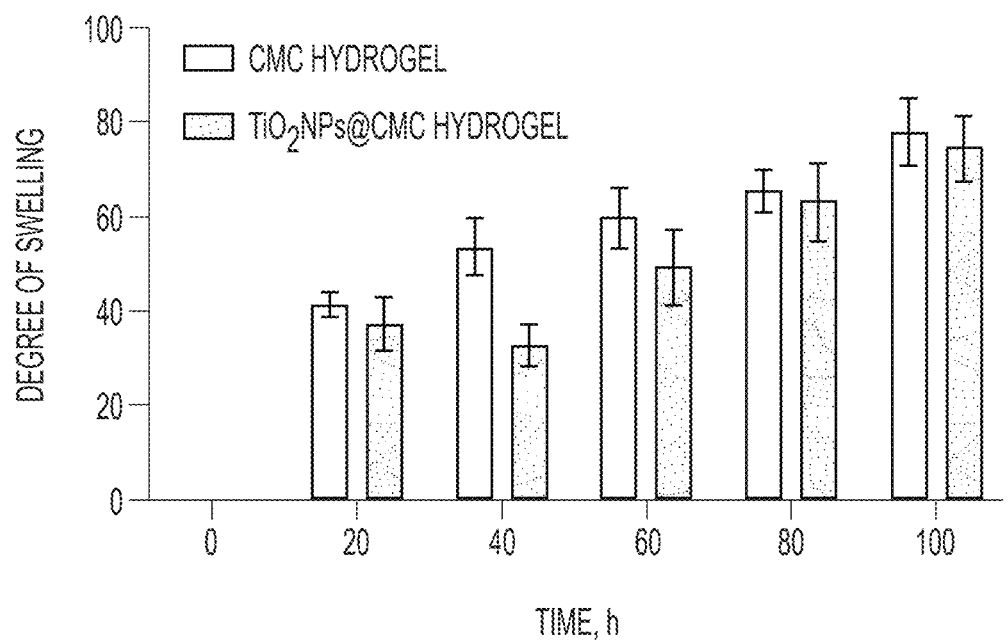
FIG. 5A depicts a graph of the Degree of Swelling of CMC and $TiO_2NPs$@CMC hydrogels at different times.
Figure 5B:
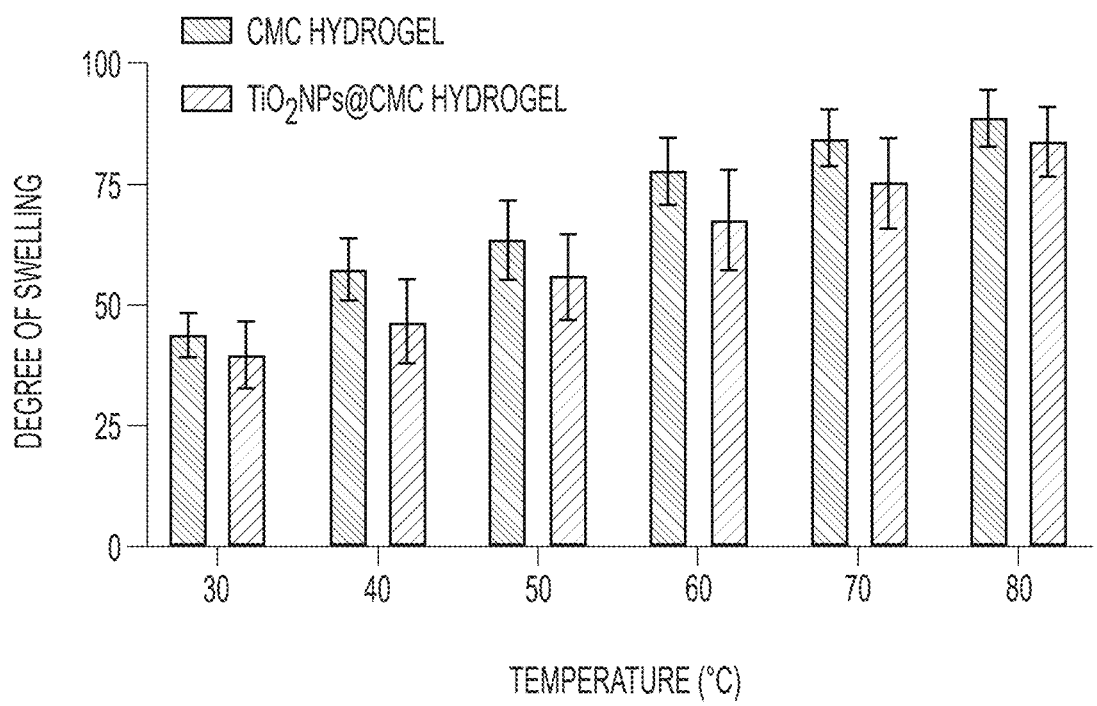
FIG. 5B depicts a graph of the Degree of Swelling of CMC and $TiO_2NPs$@CMC hydrogels at different temperatures.

FIGS. 5A-5B show the degree of swelling for CMC hydrogels and TiO$_2$NPs@CMC hydrogels at different times (0-100 h) and different temperatures (30-80° C.). The degree of swelling for CMC hydrogel recorded 41.35, 53.63, 59.59, 65.37 and 77.91%, when evaluated at different times (20, 40, 60, 80 and 100 hours, respectively). In addition, with using different temperatures, 30, 40, 60, 70 and 80° C., the degree of swelling for CMC hydrogel are 43.71, 57.32, 77.87, 84.65 and 88.71%, respectively. On the other hand, TiO$_2$NPs@CMC hydrogel recorded marginally reduction in the degree of swelling at different times and different temperatures. As shown from FIG. 5A, the degree of swelling for the TiO$_2$NPs@CMC hydrogel after immersion in water for 100 hours is 74.46% which is less than that of CMC hydrogel (77.91%). Additionally, the degree of swelling recorded 83.88 after immersing the TiO$_2$NPs@CMC hydrogel in water at 80° C. which is also less than that of CMC hydrogel (88.71%). The reduction in swelling degree of TiO$_2$NPs@CMC hydrogel is mainly attributed to the effect of TiO$_2$NPs. Due to the limited space that allows free water to enter the TiO$_2$NPs@CMC hydrogel network, the swelling capacity was decreased. Because there are no available spaces for the water during examining the swelling degree of TiO$_2$NPs@CMC hydrogel at various times and temperatures, the swelling degree values were reduced.

Microbiological Evaluation

All data were presented as means±standard deviation (SD). Each experiment was repeated three times at different time points to ensure reliability and reproducibility of the results. Figures illustrating the data were created using Origin and GraphPad Prism 0.8 software.

Agar Well Diffusion Assay. The effectiveness of CMC and TiO$_2$NPs@CMC hydrogel formulations in eradicating bacteria was investigated against six specific types: *Salmonella typhi, E. coli* O157, *Shigella dysenteriae, Enterococcus faecalis, Bacillus cereus*, and *Candida albicans*. The well diffusion method as previously described was used to assess the antibacterial activity of the two hydrogel formulations. (See Shakiba, M. et al., "Antimicrobial Activity of Different Parts of *Phoenix dactylifera*," Int. J. Mol. and Clin. Micro. 1: pp. 107-111 (2016)) In this experiment, 100 µL of each newly cultured microbial suspension was uniformly spread over the Mueller Hinton agar (MHA) surface. For the disc diffusion test, paper discs were autoclaved, containing 50 µL of each investigated nanocomposite and were subsequently placed on the agar plates with the inoculated microbiological cultures. Likewise, the same amount of each hydrogel substance was injected into the wells of the MHA agar using a syringe. The plates were kept at a temperature of 37° C. for 24 hours in the incubator. Then, the sizes of the areas around the discs and wells that had the growth inhibited were measured in millimeters (mm).

Figure 6A:
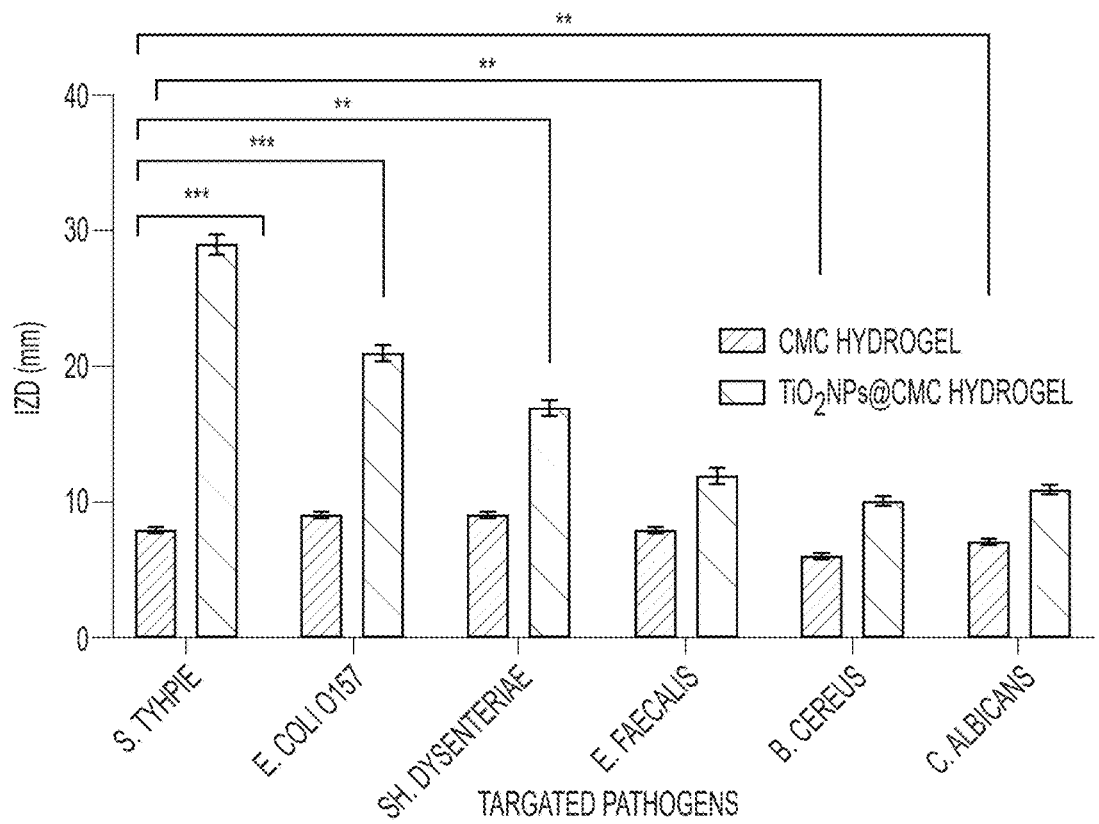
FIG. 6A depicts a graph illustrating the inhibition zone diameters for CMC hydrogels and $TiO_2NPs$@CMC hydrogels against a variety of pathogenic microbes.
Figure 6B:
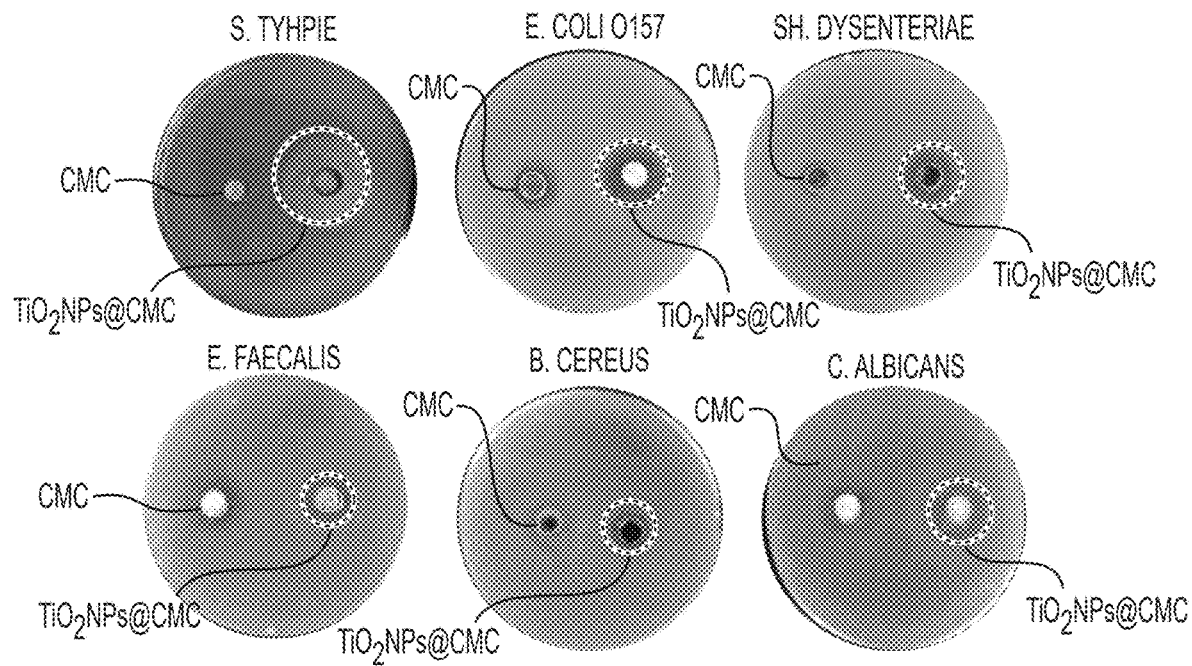
FIG. 6B depicts the actual zones of inhibition formed for CMC hydrogels and $TiO_2NPs$@CMC hydrogels against a variety of pathogenic microbes.

To determine whether the TiO$_2$NPs@CMC hydrogel is applicable as an antimicrobial agent, it is imperative to know how it acts on pathogens and other types of organisms that have different biological characteristics. Thus, the antimicrobial capabilities of these hydrogels were explored. Two formulations of hydrogels, namely CMC and TiO$_2$NPs@CMC hydrogels, were tested for their bactericidal potency using the well diffusion technique against various types of pathogenic microorganisms. These results are summarized in FIGS. 6A-6B. The capacity of the hydrogels to repress the growth of the tested diseases is demonstrated by the size of each inhibition zone. The tested pathogens included *S. typhi, E. coli* O157, *Sh. dysenteriae, E. faecalis, B. cereus*, and *C. albicans*. The average inhibition zone size resulting from exposing these pathogens to the CMC hydrogel were: 8±0.18 mm, 9±0.14 mm, 9±0.23 mm, 8±0.10 mm, 6±0.26 mm, and 7±0.32 mm, respectively. However, the average diameter of inhibitory zone of the TiO$_2$NPs@CMC hydrogel against *S. typhi, E. coli* O157, *Sh. dysenteriae, E. faecalis, B. cereus*, and *C. albicans* measured 29±0.74, 21±0.52, 17±0.44, 12±0.61, 10±0.38, and 11±0.24 mm, respectively. The difference in hydrogel activities when comparing the two formulations indicated that incorporating TiO$_2$NPs in the CMC hydrogel significantly enhances the antibacterial activity of hydrogel. Much wider inhibition zones are regularly observed for the TiO$_2$NPs@CMC hydrogel when compared to the CMC hydrogel, which shows their remarkable efficiency. The hydrogel with TiO$_2$NPs could act as a physical barrier with improved antimicrobial activity. One explanation for this would be if the TiO$_2$NPs are able to in-situ release antimicrobial substances, thereby providing a significantly stronger effect on microbial growth prevention.

Determination of Minimum Inhibitory Concentration (MIC) and Minimum Bactericidal Concentration (MBC). To identify the MIC and MBC values of TiO$_2$NPs@CMC hydrogel the Microdilution broth test was used as described previously. (See Parvekar, P. et al., "The minimum inhibitory concentration (MIC) and minimum bactericidal concentration (MBC) of silver nanoparticles against *Staphylococcus aureus*," Biomater. Investig. Dent. 7:105-109 (2020)) Briefly, LB broth medium was sterilized, and microorganisms (*S. typhie, E. coli* O157, *Sh. dysenteriae, E. faecalis, B. cereus*, and *C. albicans*) were then cultured in the LB broth medium at 37° C. by rotating it at 200 rpm. Five CMC hydrogel with TiO$_2$NPs at different concentrations ranging from 25 to 1000 µg/mL were prepared in a 96-well microplate. Following the addition, the microplates were then incubated, and the MIC values were determined visually. After that, 100 µL from each well was spot upon LB agar plates and remained at 37° C. for 18-24 hours until colonies became visible. After incubation, CFUs were counted manually. The MBC is the concentration at which the number of CFU is reduced to 0.1%.

Figure 7:
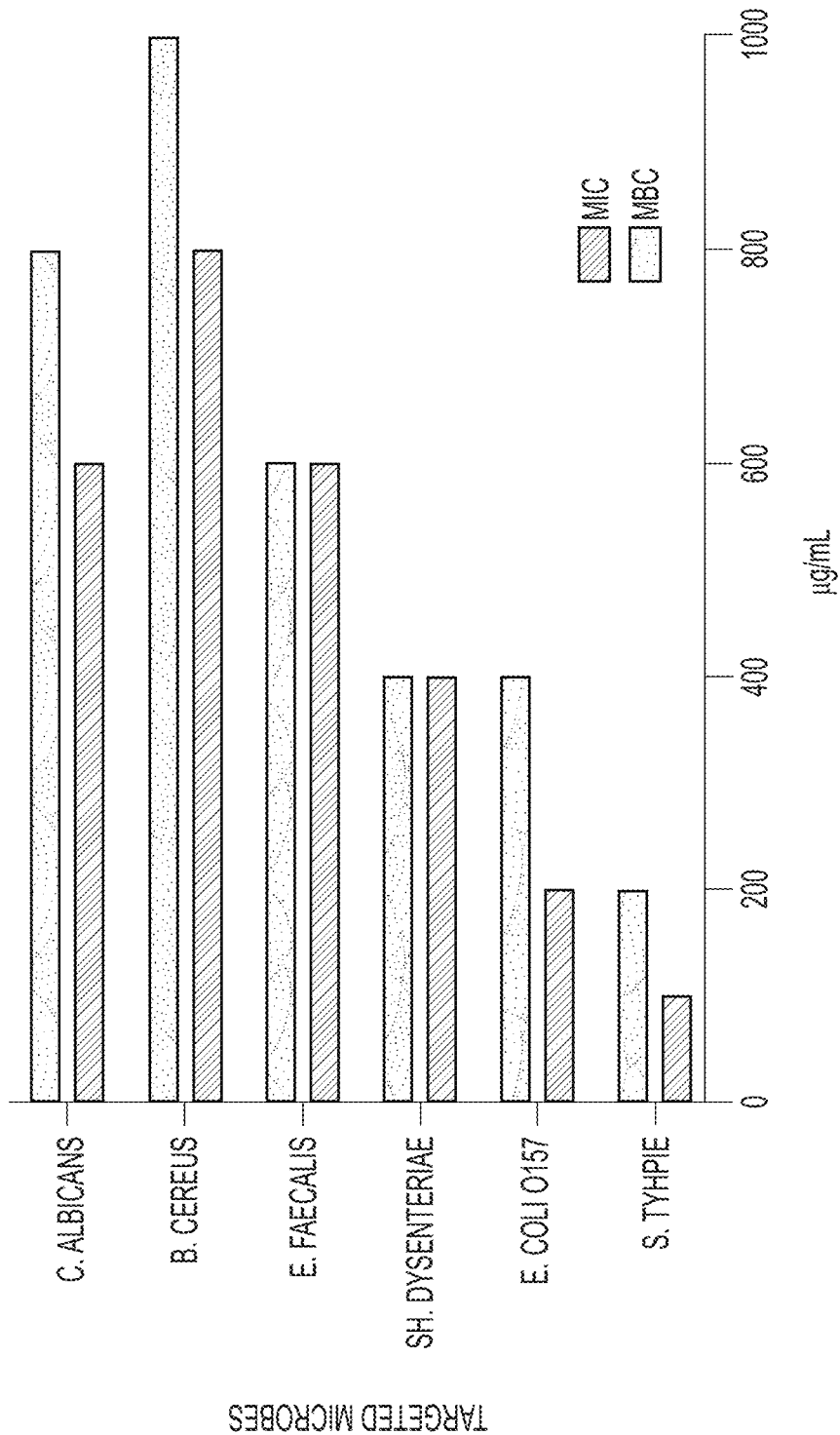
FIG. 7 depicts a graph illustrating the MIC and MIB values of $TiO_2NPs$@CMC hydrogels against a variety of pathogenic microbes.

The microdilution method was used to determine the MIC and MBC of TiO$_2$NPs@CMC hydrogels against different harmful bacteria and the results are summarized in FIG. 7. The MIC value for S. typhie was 100 µg/mL; consequently, it could be considered an adequate inhibition level for the pathogen. This demonstrates that a high dose is required to destroy S. typhie, confirmed by the MBC of 200 µg/mL. The MIC for *E. coli* 0157 was determined to be 200 µg/mL; hence, that value adequately suppresses the growth of the bacterium, while the MBC was 400 µg/mL. For Sh. *dysenteriae*, the MIC and MBC values were 400 µg/mL. The MIC and MBC values for *E. faecalis* that prevented evolution and destroyed viable bacterial cells were estimated to be 600 µg/mL. The MIC for *B. cereus* was recorded as 800 µg/mL, indicating high efficacy for inhibiting bacterial growth, while the MBC value was 1000 µg/mL. For *C. albicans* the values of MIC and MBC were 600 and 800 µg/mL, respectively. The available data can enable the recent applications of TiO$_2$NPs@CMC hydrogel as antibacterial to be practiced.

Time-Kill Assay. A time-kill test was run as reported previously to determine the optimum duration required for killing the TiO$_2$NPs@CMC hydrogels. (See Huang, et al., "Antibacterial activity and cytotoxicity of two novel crosslinking antibacterial monomers on oral pathogens," Arch. oral Biol. 56: pp. 367-373 (2011)) Briefly, suspensions of the CMC hydrogels and the TiO$_2$NPs@CMC hydrogels were exposed to 1, 2, and 4 times the MIC (as determined above). The volume of the suspension (0.5 mL) was placed in a water bath at 37° C. and was swirled softly. The treatments were conducted for 20-180 minutes and 10 µL of diluted solution was seeded on the agar plate. For bacterial and yeast species, the quantification of surviving colonies was done after 24 hours of aerobic incubation at 37° C. and 3-4 d at 30° C., respectively.

Figure 8A:
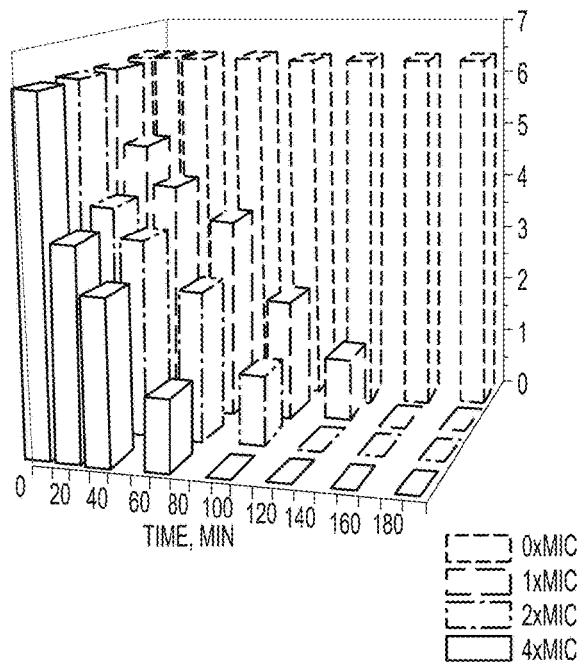
FIGS. 8A-8F depict graphs of the killing time of three different dosages (1×MIC 2×MIC and 4×MIC) of $TiO_2NPs$@CMC hydrogels against *S. typhi* (FIG. 8A), *E. coli* O157 (FIG. 8B), Sh. *dysenteriae* (FIG. 8C), *E. faecalis* (FIG. 8D), *B. cereus* (FIG. 8E), *C. albicans* (FIG. 8F).
Figure 8B:
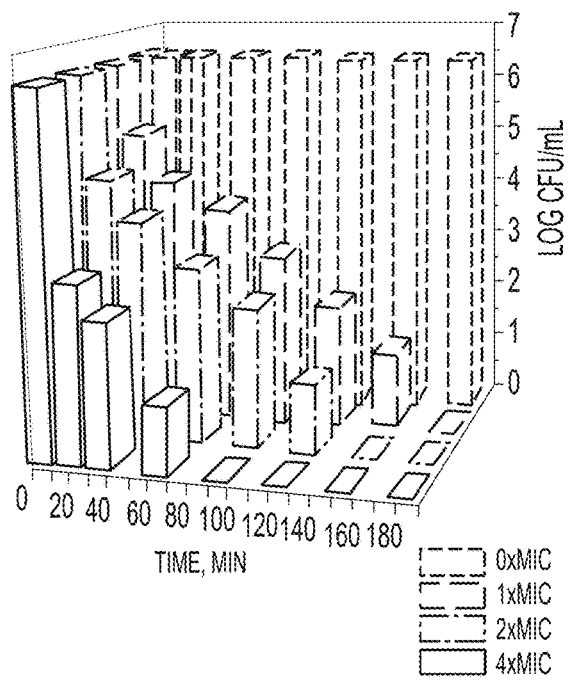
Figure 8C:
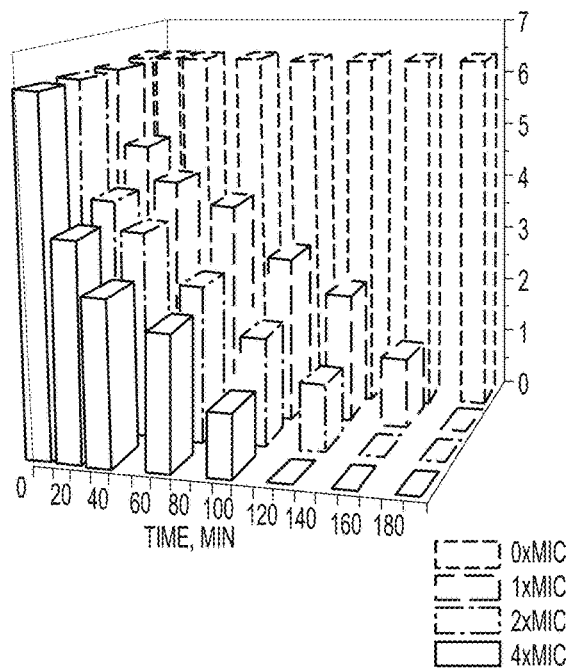
Figure 8D:
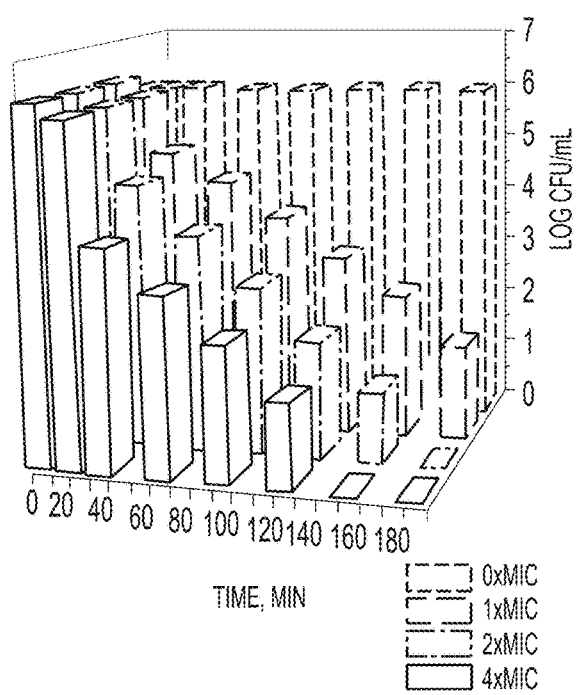
Figure 8E:
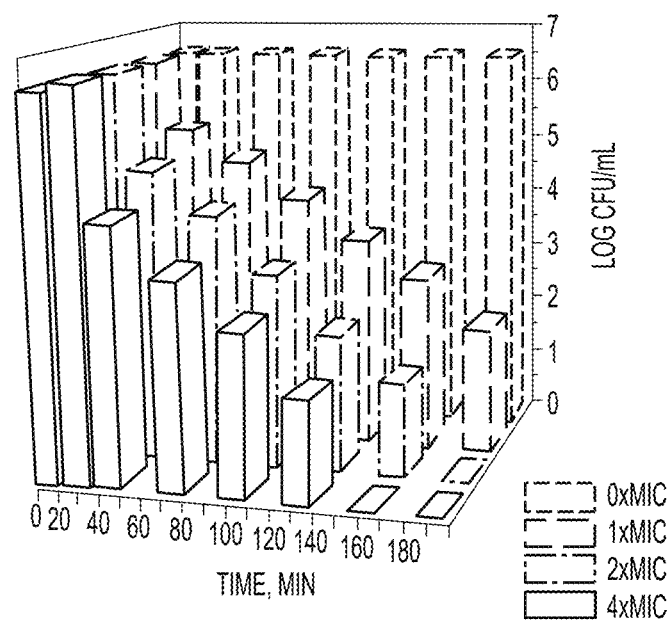
Figure 8F:
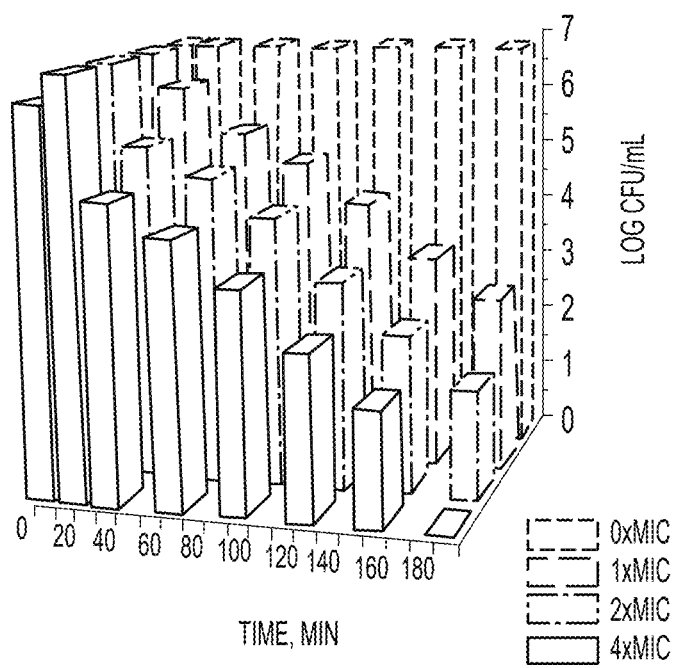
Figure 9A:
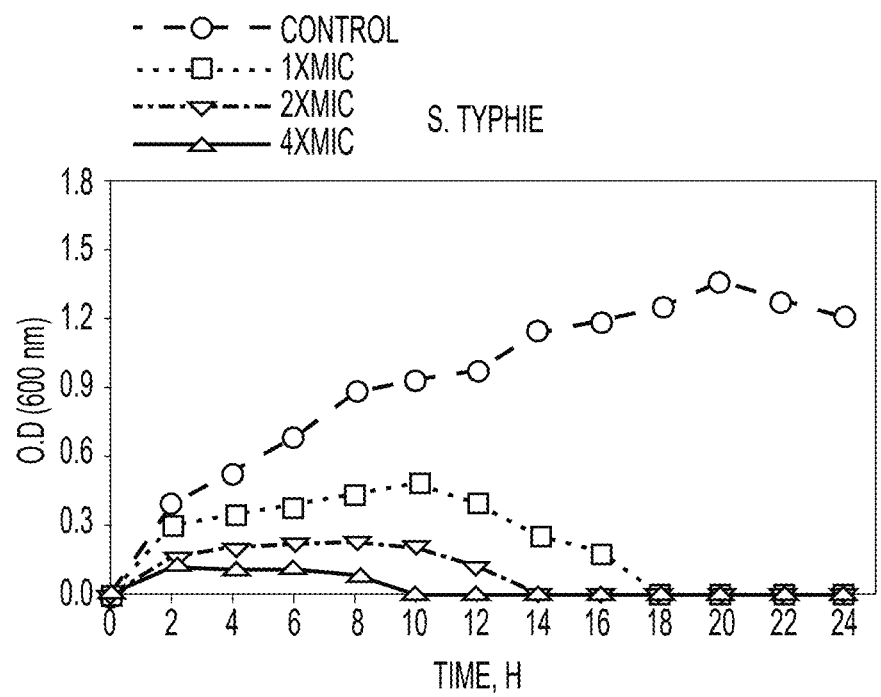
FIGS. 9A-9F depict graphs of growth curves of *S. typhi* (FIG. 9A), *E. coli* O157 (FIG. 9B), Sh. *dysenteriae* (FIG. 9C), *E. faecalis* (FIG. 9D), *B. cereus* (FIG. 9E), *C. albicans* (FIG. 9F) treated with various concentrations of $TiO_2NPs$@CMC hydrogels and compared to untreated controls.
Figure 9B:
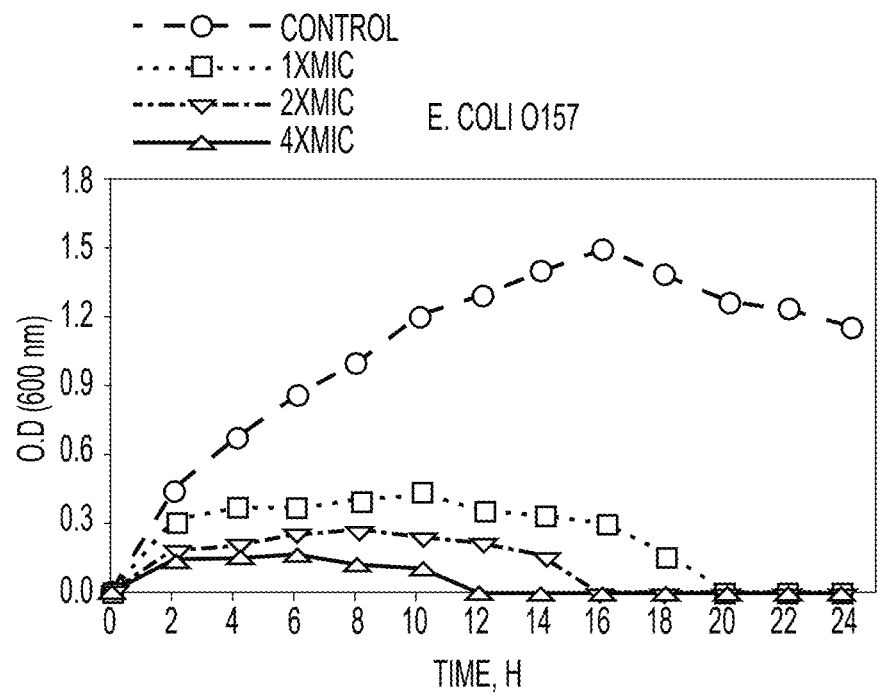
Figure 9C:
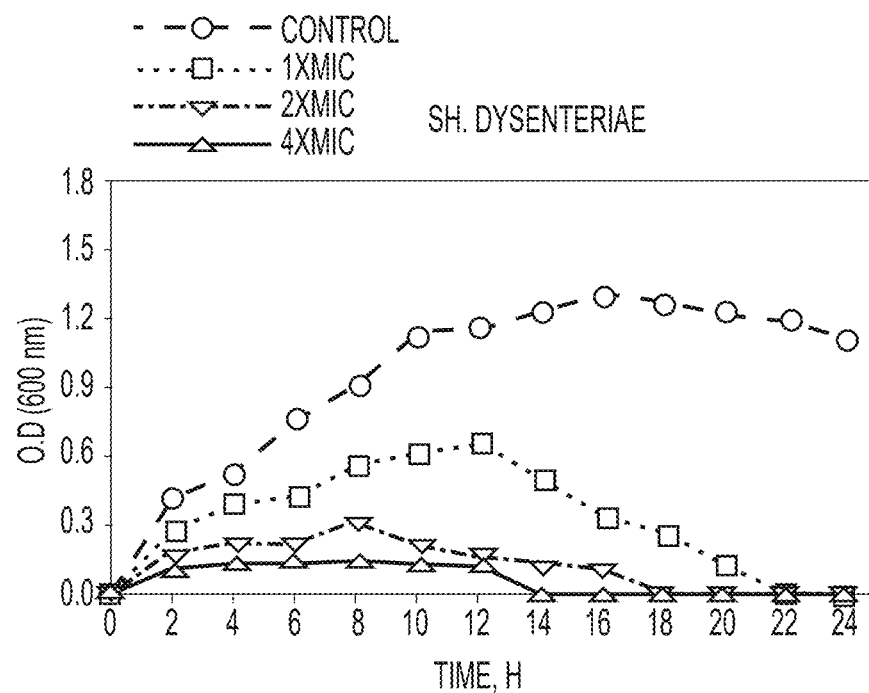
Figure 9D:
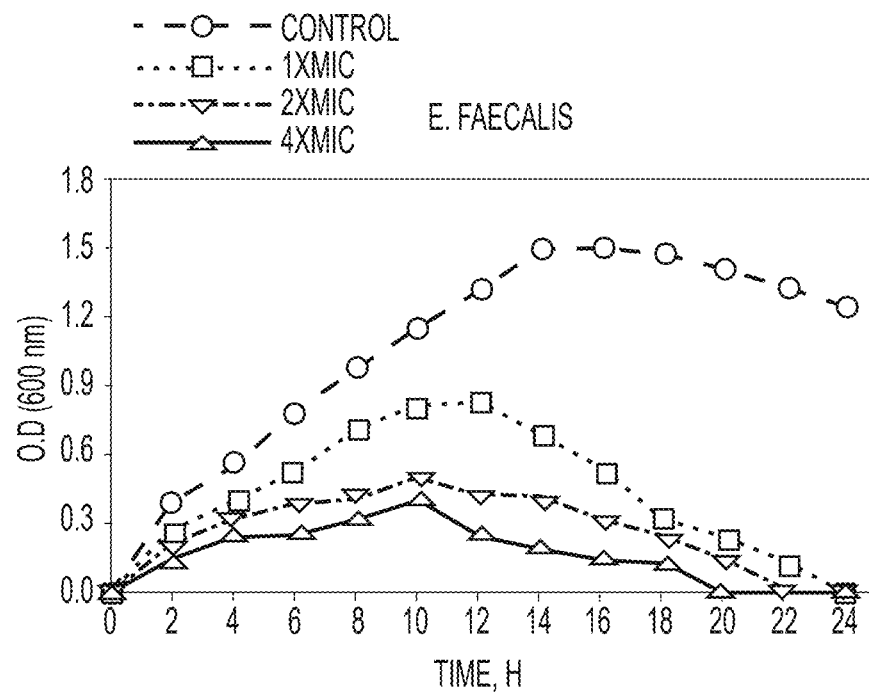
Figure 9E:
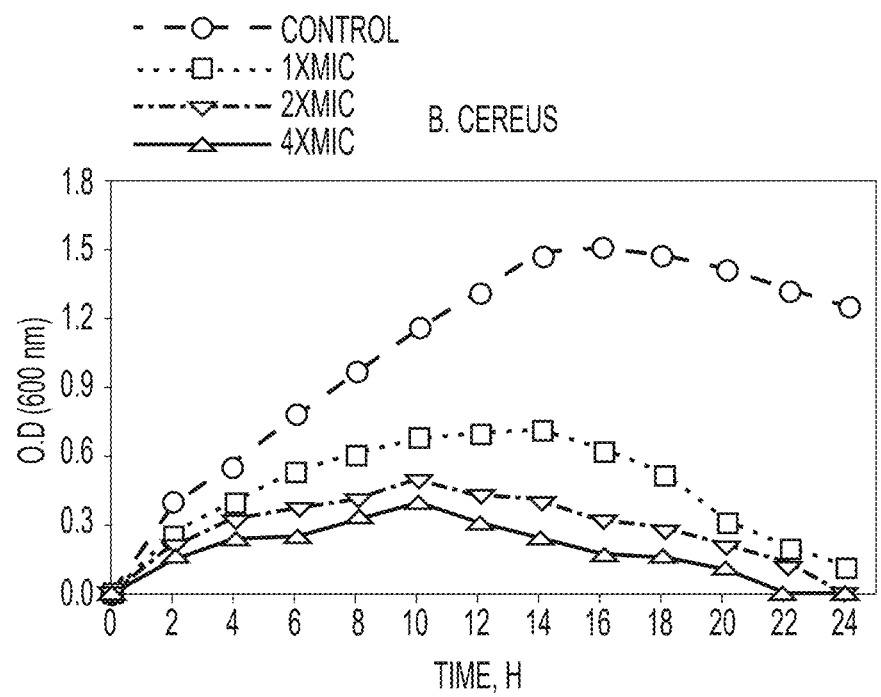
Figure 9F:
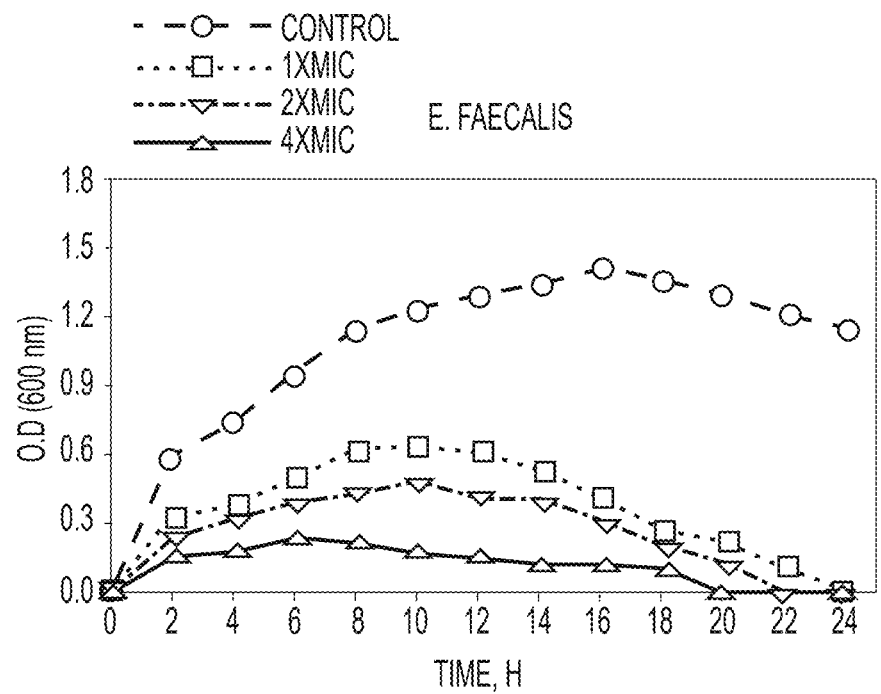

The present study examined three concentrations (1×MIC, 2×MIC, and 4×MIC) of TiO$_2$NPs@CMC hydrogels under distinct time intervals (0-180 minutes) against S. typhie, E. coli O157, Sh. dysenteriae, E. faecalis, B. cereus, and C. albicans. FIG. 8A illustrates the killing time needed to eradicate S. typhie growth at different hydrogel dosages. At 1×MIC, the killing time was 100 minutes, while at 2×MIC and 4×MIC, the killing times extended to 120 and 160 minutes, respectively. This indicates that higher hydrogel dosages necessitate longer durations to eradicate S. typhie growth. Similarly, FIG. 8B illustrates the time required to eliminate E. coli 0157 growth. At 1×MIC, the killing time was 100 minutes, which increased to 160 and 180 minutes at 2×MIC and 4×MIC, respectively. These results suggest that higher hydrogel dosages require extended exposure periods to eradicate E. coli O157 effectively. FIG. 8C demonstrates the time needed to deactivate entirely Sh. Dysenteriae, where at 1×MIC, the killing time was 120 minutes, while at 2×MIC and 4×MIC, it increased to 160 and 180 minutes, respectively. For E. faecalis and C. albicans, on the other hand, (FIGS. 8D & 8F), the killing times stayed the same at 160 and 180 minutes for 2×MIC and 4×MIC dosages, respectively. This suggests that higher hydrogel dosages do not significantly affect the time needed to remove these microbes. For B. cereus, FIG. 8E shows that a killing time of 180 minutes was recorded at 4×MIC, which means that a higher hydrogel dosage is needed to kill the bacteria completely. These results help us understand how TiO$_2$NPs@CMC hydrogel works against different microorganisms over time and at different doses. Furthermore, the results show that higher doses usually require more prolonged exposure to completely kill microbes. This is valuable information for improving the use and dosage strategies of TiO$_2$NPs@CMC hydrogel in antimicrobial treatments.

Physiological Alteration of Microbial Growth. To establish changes in the physiological development of each specific microbial clone, we evaluated the growth rate and the level of leakage of intracellular proteins accordingly to methods reported previously. (See Navarro-Perez, M. L., et al., "Decomposition of Growth Curves into Growth Rate and Acceleration: a Novel Procedure To Monitor Bacterial Growth and the Time-Dependent Effect of Antimicrobials," Appl. Environ. Microbiol. 88 (2022) and Bradford, M. M., "A rapid and sensitive method for the quantitation of microgram quantities of protein utilizing the principle of protein-dye binding," Anal. Biochem. 72: pp. 248-254 (1976)) A total of 3 tubes were prepared with different growth rate, each holding 10 mL of sterile LB and malt extract broth. Respectively, 100 µL of each fresh microbial suspension was added to each tube. The hydrogels were administered to each tube in an effective dosage of 4×MIC; one tube however was used as a negative control, containing only the microbial species with no dose of nanomaterial. The tubes were put in an incubator maintained at a temperature of 37° C. and they were shaken continuously at 200 rpm. 0.5 ml samples were removed from each tube at 2-hour intervals, and the microbial growths were determined by testing optical densities. Furthermore, the protein levels produced from dead microbial cells after 6-hours of exposure to an effective dose were also measured by the Bradford test.

The growth curves of targeted microbes, encompassing S. typhi, E. coli O157, Sh. dysenteriae, E. faecalis, B. cereus, and C. albicans, were evaluated in the presence of three MIC doses of TiO$_2$NPs@CMC hydrogel across various time intervals. FIGS. 9A-9F illustrate these growth curves, contrasting the control samples (microbes without TiO$_2$NPs@CMC hydrogel) with those exposed to effective doses of the nanomaterial based on MIC values. In the absence of TiO$_2$NPs@CMC hydrogel, control samples displayed typical growth patterns for each tested strain, serving as a baseline for comparison. However, upon exposure to effective doses of TiO$_2$NPs@CMC hydrogel corresponding to their MIC values, a notable reduction in growth rate was observed among the targeted microbes. This indicated a significant deviation from the standard growth curves. Specifically, the growth curve slope for each strain experienced a substantial decline after specific time intervals. Likewise, S. typhi exhibited a significant decrease in slope after 10 hours, while E. coli O157 displayed a similar decline after 12 hours. Likewise, Sh. dysenteriae, E. faecalis, B. cereus, and C. albicans demonstrated reduced growth curve slopes after 14, 20, 22, and 20 hours, respectively. These observations underscore the pronounced inhibitory effect of effective doses of TiO$_2$NPs@CMC hydrogel on the growth of targeted microbes. The alterations in growth curves suggest that the hydrogel doses negatively influenced the growth dynamics of the microbes, resulting in discernible changes in their growth patterns over time.

Figure 10:
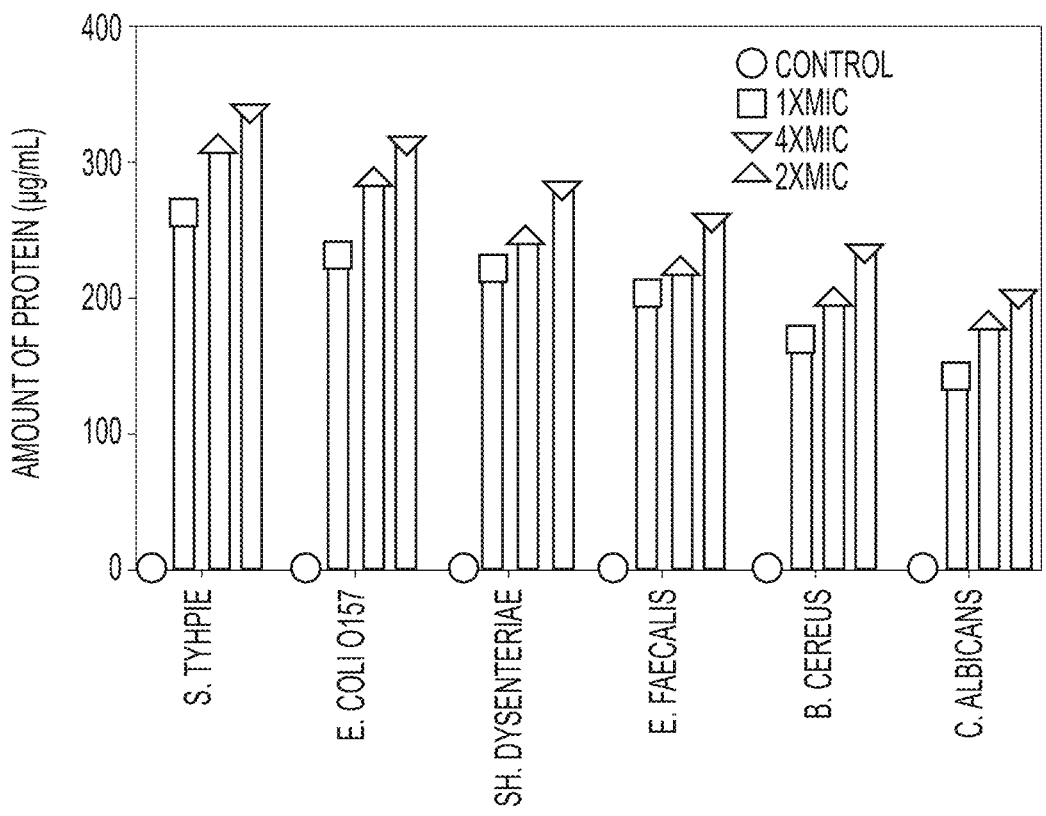
FIG. 10 depicts a graph illustrated released intracellular protein of microbes treated with various concentrations of $TiO_2NPs$@CMC hydrogels and compared to untreated controls.

Measures of intracellular fluid, especially protein, released from inside bacterial cells after rupture were increased after exposure to TiO$_2$NPs@CMC hydrogels in all tested microorganisms. The impact of TiO$_2$NPs@CMC hydrogels on the target microorganisms' capacity to generate intercellular proteins was investigated and these data are summarized in FIG. 10. Significant variations in the quantities of intercellular protein release may be seen when comparing the control samples with the hydrogel at different concentrations (1×MIC, 2×MIC, and 4×MIC). The absence of hydrogel treatment led to little protein release since no discernible intracellular protein was detected in the control samples for any of the bacteria under investigation. However, each of the microorganisms analyzed exhibited a significant increase in intracellular protein synthesis upon exposure to the hydrogels. The intercellular protein levels for S. typhie at the 1×MIC, 2×MIC, and 4×MIC doses were 264 µg/mL, 315 µg/mL, and 336 µg/mL, respectively. Similarly, E. coli 0157 exhibited intercellular protein concentrations of 231 µg/mL, 290 µg/mL, and 312 µg/mL at the given dosages. Sh. dysenteriae exhibited intercellular protein concentrations of 221 µg/mL, 246 µg/mL, and 278 µg/mL at dosages equivalent to 1×MIC, 2×MIC, and 4×MIC, respectively. On the other hand, E. faecalis exhibited values of 204 µg/mL, 225 µg/mL, and 254 µg/mL. The intercellular protein amounts for B. cereus were 168 µg/mL, 201 µg/mL, and 231 µg/mL, whereas, for C. albicans, the corresponding concentrations were 143 µg/mL, 184 µg/mL, and 201 µg/mL. These findings indicate that the TiO$_2$NPs@CMC hydrogels have the potential to enhance the release of intercellular proteins from specific microorganisms in a manner that is dependent on the concentration. Varying protein concentrations suggest that the hydrogel treatment influences the protein composition of the microorganisms, impacting their growth, behavior, and even ability to cause disease.

A uniform peptidoglycan layer constitutes the bulk of the bacterial cell wall, which is sandwiched between protoplasm and the cell wall. Bacterial cells rely on this structural component to keep their form and protect them from harmful environmental factors. Bacteria are classified as either Gram-positive or Gram-negative according to the makeup of their cell walls. Because of the presence of a multilayer of peptidoglycan polymer, Gram-positive bacterial strains are identified by thick cell walls, measuring roughly 20-80 nm thick. In contrast, Gram-negative bacteria have two membranes (an outer and a cytoplasmic one) and a weaker layer of peptidoglycan (7-8 nm) in their cell walls.

It is evident from the results that Gram-negative bacteria have a greater quantity of protein leaking from their membranes than Gram-positive bacteria. Possible explanations for this variance include changes in the composition and thickness of the peptidoglycan layer found in bacterial cell walls. Senthil et al. similarly observed that Gram-positive bacteria have lower protein leakage than Gram-negative bacteria, theorizing that this difference results from the peptidoglycan layer protecting microbial cells from antimicrobial agents, contaminants, pollutants, and degrading enzymes. (See Senthil, B., et al., "Non-cytotoxic effect of green synthesized silver nanoparticles and its antibacterial activity," J. Photochem. Photobiol. B. Bio. (2017))

Toxicity Assay. All dosages of TiO$_2$NPs@CMC hydrogel were tested for biocompatibility and toxicity to ensure they were safe to use in the environment. Utilizing lyophilized photobacteria, *Vibrio fischeri*, diluent, and reconstitution reagents, these tests were conducted utilizing the ToxAlert® 100 system. Using the ToxAlert® 10 Luminometer, the samples were incubated for 5-15 minutes at controlled cooling temperatures to detect the luminescence light emitted by the bacterium. Precise detection and measurement of the bioluminescence produced by the bacteria in response to the examined substances highlights the significance of precision and meticulous adherence to system protocols in conducting credible toxicity assessments.

Figure 11:
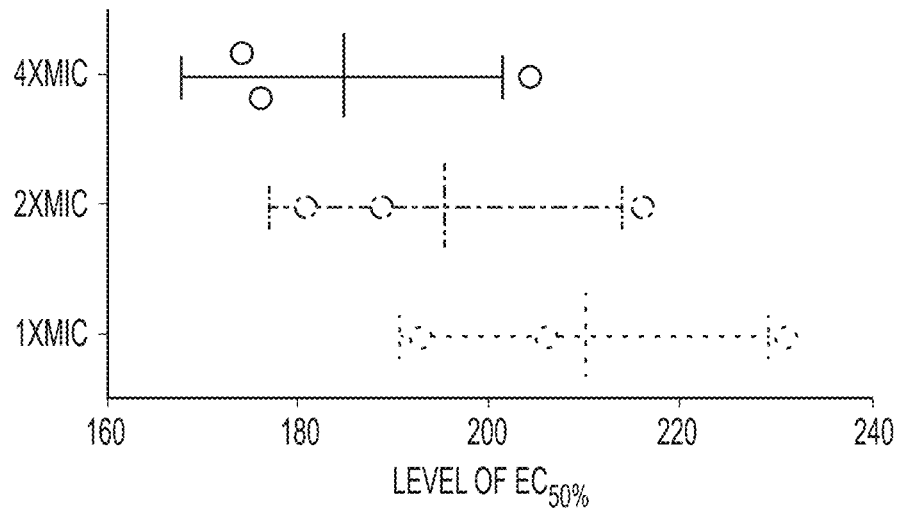
FIG. 11 depicts the $EC_{50}$% concentration of $TiO_2NPs$@CMC hydrogels at three different dosages over duration of incubation (5, 10, and 15 min).

During different contact times (5, 15, and 30 minutes), the toxicity of three different MIC concentrations of TiO$_2$NPs@CMC hydrogels were evaluated to determine EC$_{50}$ values. Administered doses were 1×MIC, 2×MIC and 4×MIC. The EC$_{50}$ values were greater than one hundred as shown in FIG. 11. This implies that this formulation of TiO$_2$NPs@CMC hydrogel is biocompatible without toxic effect, and it is well suited for use in water treatment and other environmental applications because it has no dangerous impacts on human health. It is important to stress that TiO$_2$NPs@CMC hydrogel is non-toxic. Since metal oxide nanoparticles have a negative impact beyond the bacterial cell cytoplasm which may be seen by this fact alone. The results from this study showed that, even at low concentration rates, tested TiO$_2$NPs@CMC hydrogels were non-cytotoxic but had great antibacterial activities. These findings add further evidence to a growing body of research suggesting that TiO$_2$NPs@CMC hydrogel could be employed as an effective and safe antibacterial agent someday. Further, it is not toxic hence can be used for microbial control applications such as water purification.

Antibiofilm Properties of TiO$_2$NPs@CMC Hydrogels. The efficacy of the TiO$_2$NPs@CMC hydrogel in inhibiting biofilm formation was measured by means of a 96-well microtiter plate, where the hydrogel was stained with crystal violet. The overnight culture of 10 μL was added to each well after each well received 180 μL of MH broth. The concentration of TiO$_2$NPs@CMC hydrogel was set between 5 and 45 mg/mL in the last step. This concentration was put to each well. The wells were washed with phosphate-buffered saline after incubating for 24 h at 37° C., and the contents were discarded. Biofilm were fixed by applying 2% acetic acid, and staining was achieved with 0.1% crystal violet dye. After that, the biofilm formation was examined by formation violet color in the wells.

Figure 12:
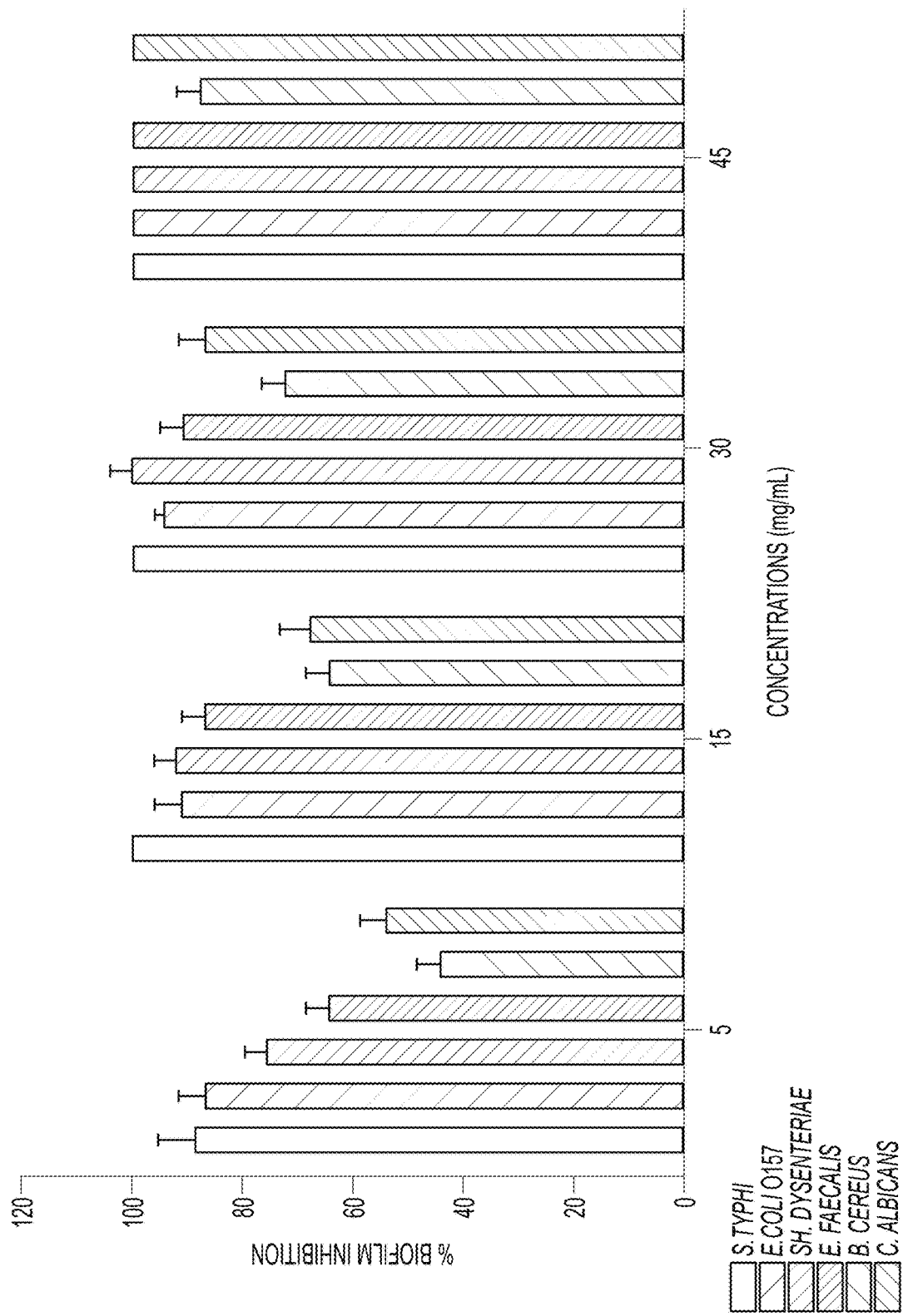
FIG. 12 depicts a graph illustration biofilm inhibition and antibiofilm activity of $TiO_2NPs$@CMC hydrogels against a variety of pathogenic microbes.

To study the antibiofilm activities of TiO$_2$NPs@CMC hydrogel, a CV test was performed to find the optimal doses that prevent biofilm development. The microorganism inhibition rates against the tested microorganisms at the various doses of hydrogel are illustrated in FIG. 12. The results revealed complete inhibition of biofilm formation by all targeted microorganisms except for *B. cereus*. The results exhibited an 87.6% biofilm inhibition against *B. cereus* when treated with 45 mg/mL of TiO$_2$NPs@CMC hydrogel. The TiO$_2$NPs@CMC hydrogel demonstrated potent antibiofilm properties since it managed to inhibit the test microorganisms from forming biofilms. The hydrogel effectively prevented biofilm formation and entirely killed the biofilm of the selected microorganisms at a mostly used dose of 45 mg/mL. A high biofilm inhibition % means that the hydrogel kept microorganisms from making biofilm by disturbing their attachment and maturation activity.

Disinfection of Wastewater Using an Effective Dosage of TiO$_2$NPs@CMC Hydrogels. Sewage water samples contaminated with targeted waterborne pathogens were treated with a dosage equivalent to 2×MIC of TiO$_2$NPs@CMC hydrogel. The disinfection experiment was conducted over a time course ranging from 0 to 240 minutes. At each time interval, the microbial densities of the pathogens were quantified using colony-forming unit (CFU) counting. The log counts of *S. typhie*, *E. coli* O157, *Sh. dysenteriae*, *E. faecalis*, *B. cereus*, and *C. albicans* were recorded and analyzed.

Figure 13A:
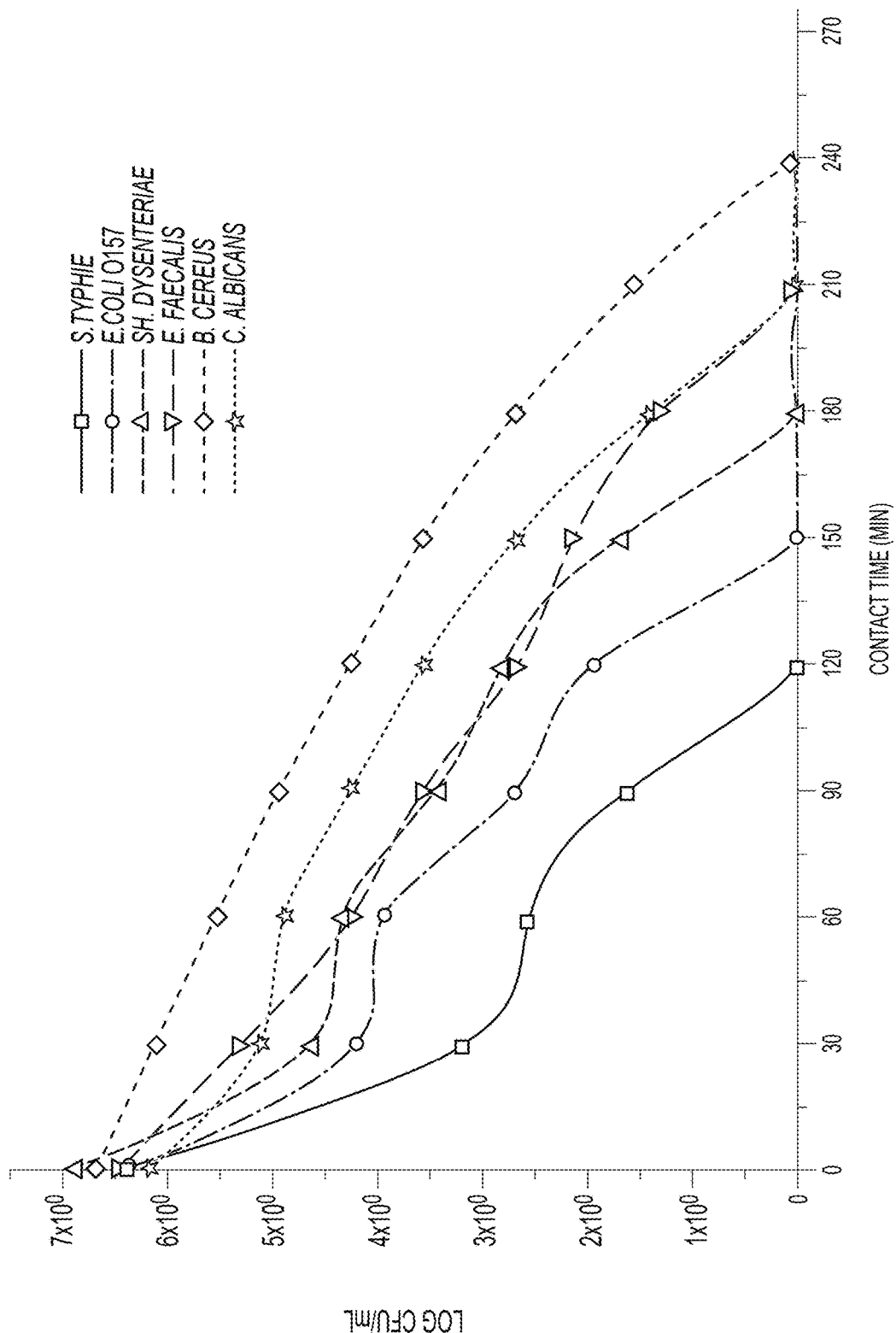
FIG. 13A depicts a graph illustrating disinfection effectiveness of a 2×MIC dosage of $TiO_2NPs$@CMC hydrogels against a variety of pathogenic microbes.
Figure 13B:
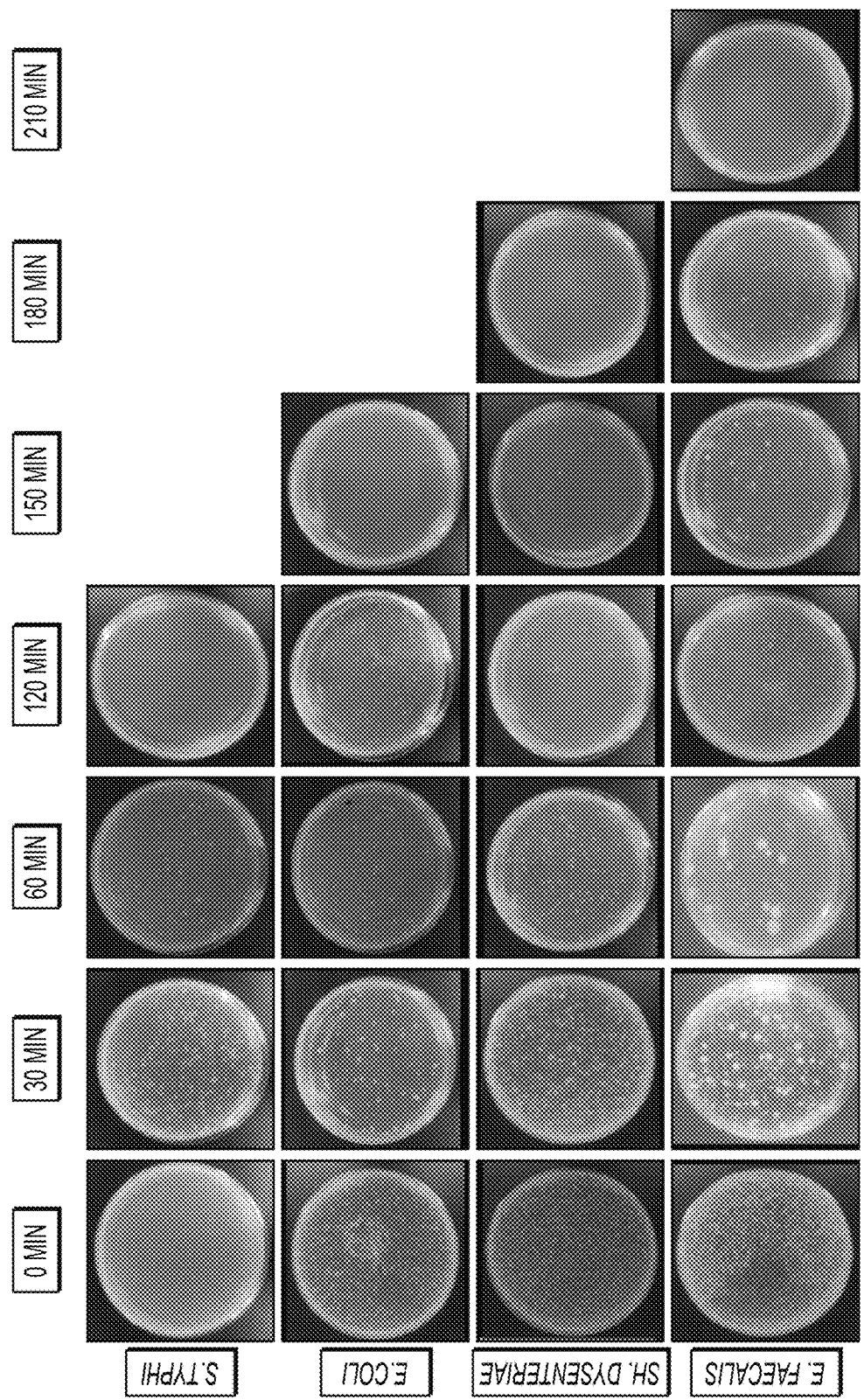
FIG. 13B depicts the actual microbial growth observed when calculating the disinfection effectiveness of a 2×MIC dosage of $TiO_2NPs$@CMC hydrogels against a variety of pathogenic microbes.

Diseases that are contracted through water are the most dangerous health problems for society as a whole. Thus, the application of efficient disinfection approaches is required. The TiO$_2$NPs@CMC hydrogel appear to provide a particularly suitable option for this application thanks to their antibacterial properties. The TiO$_2$NPs@CMC hydrogel function includes photocatalytic activity because of the presence of TiO$_2$NPs. It produces ROS with antimicrobial action. The hydrogel matrix made of CMC acts as the core holder, and the TiO$_2$NPs act as the core. This is also believed to control the release of TiO$_2$NPs, therefore improving their interaction with pathogens. Efficiency of TiO$_2$NPs@CMC hydrogel in disinfecting sewage water containing different waterborne pathogens is demonstrated in FIGS. 13A and 13B. The densities of such specific pathogens as *S. typhi*, *E. coli* O157, *Sh. dysenteriae*, *E. faecalis*, *B. cereus*, and *C. albicans* were tested at different intervals through the disinfection protocol to determine their levels. At the start time (0 minutes), microbial populations of all pathogens were relatively high, with logarithm counts lying between 6.17 to 6.89 CFU/mL.

During the disinfection experiment, a significant drop of bacterial contamination for all diseases was demonstrated. This reduction exemplifies the bactericidal features of the TiO$_2$@CMC hydrogel. After the treatment time of 30 minutes, we observed a very important decrease in the log counts of all pathogens as compared to the baseline counts. The reduction of microbial populations ranged from about 1.2 to 2.7 logs CFU/mL. This implies that the hydrogel managed to reduce the number of the particular pathogen within a sufficiently short period of time. Extending the disinfection process time to 60 minutes led subsequently to a further overall decrease in bacteria counts among all diseases. The disinfection process had already begun and after 120 minutes the entire inactivation of *S. typhi* was achieved when the log count became zero. *E. coli* O157 and *Sh. dysenteriae* significantly decreased, with the log counts of about 1.95 and 2.81 CFU/mL respectively. A logarithmic reduction was observed in the count of *E. faecalis* to 2.67 CFU/mL; however, *B. cereus* and *C. albicans* had log counts of 4.25 and 3.57 CFU/mL, respectively. The following time intervals (150-240 minutes) were characterized by the same trend of a decrease in microbial populations concerning all pathogens.

It is to be understood that the carboxymethyl cellulose hydrogel loaded with $TiO_2$ nanoparticles for wastewater treatment is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method of making a carboxymethyl cellulose (CMC) hydrogel loaded with $TiO_2$ nanoparticles (NPs) comprising:
    providing raw date fiber;
    bleaching the raw date fiber to obtain bleached date fiber;
    delignifying the bleached date fiber to obtain delignified date fiber;
    alkalizing the delignified date fiber to obtain alkalized date fiber;
    esterifying the alkalized date fiber to obtain date derived carboxymethyl cellulose;
    dissolving the date derived carboxymethyl cellulose in calcium chloride to form a paste solution of CMC-$CaCl_2$;
    adding about 0.6 g of $TiO_2$NPs to the paste solution to obtain a mixture;
    stirring the mixture for about 4 hours to obtain a $TiO_2$NPs-CMC-$CaCl_2$ paste;
    storing the $TiO_2$NPs-CMC-$CaCl_2$ paste for about 24 hours followed by washing and centrifuging to obtain washed $TiO_2$NPs-CMC-$CaCl_2$ paste;
    refrigerating the washed $TiO_2$NPs-CMC-$CaCl_2$ paste for about 24 hours; and freeze drying for about 48 hours to obtain a $TiO_2$NPs-CMC-$CaCl_2$) hydrogel.

2. The method of claim 1, comprising:
    the bleaching the raw date fiber comprises using about 4% w/v $NaClO_2$ solution acidified to a pH of about 3.5-4.0 with 10% v/v glacial acetic acid.

3. The method of claim 2, wherein the bleaching the raw date fiber is performed under constant stirring at about 80° C. for about 1 hour.

4. The method of claim 3, wherein the bleaching is performed using about 1:50 fiber-to-$NaClO_2$ solution ratio.

5. The method of claim 1, comprising washing the bleached date fiber prior to the delignifying step, wherein the washing comprises:
    washing the bleached date fiber until the pH of filtrate of the bleached date fiber reaches about 6.5-7;
    and drying the bleached date fiber at about 105° C. for about 24 hours.

6. The method of claim 1, comprising:
    the delignifying the bleached date fiber with about 4% w/v NaOH solution at about 25-30° C. for about 30 minutes, using a 1:50 bleached date fiber-to-NaOH solution ratio.

7. The method of claim 6, comprising washing the delignified date fiber prior to the alkalizing step, wherein the washing comprises:
    rinsing the delignified date fiber until pH of a filtrate of the delignified date fiber reaches about 6.5-7; and
    drying the rinsed delignified date fiber at about 105° C. for about 24 hours.

8. The method of claim 1, comprising:
    in the dissolving the date derived carboxymethyl cellulose, about 25% w/v date derived carboxymethyl cellulose is dissolved in about 5% w/v calcium chloride solution under constant stirring for about 4 hours to obtain the paste solution of CMC-$CaCl_2$); and
    placing the paste solution in a petri dish and storing the paste solution for about 24 hours to allow cross-linking to complete.

9. The method of claim 8, comprising:
    washing the paste solution prior to the step of adding $TiO_2$ nanoparticles, wherein the washing step includes:
        washing the paste solution three times with water; and
        centrifuging the paste solution to remove any residual $CaCl_2$.

10. The method of claim 1, comprising:
    making the $TiO_2$ nanoparticles by a process comprising hydrolysis and peptization steps.

11. The method of claim 10, wherein the hydrolysis step comprises adding titanium isopropoxide (TIPP) to nitric acid ($HNO_3$) in a dropwise fashion under constant stirring to obtain a slurry comprising a white precipitate.

12. The method of claim 11, wherein the peptization step comprises heating the slurry comprising the white precipitate to 80° C. with mechanical stirring for about 12 hours.

13. The method of claim 12, comprising:
    centrifuging the heated slurry to isolate the white precipitate;
    drying the white precipitate to obtain a dried white precipitate; and
    calcining the dried white precipitate to obtain the $TiO_2$ nanoparticles.

14. The method of claim 11, comprising adding about 100 mL titanium isopropoxide (TIPP) to about 300 mL nitric acid ($HNO_3$, 0.1M) dropwise at room temperature under constant stirring to obtain the white precipitate.

15. The method of claim 14, wherein the peptization step comprises heating a slurry comprising the white precipitate to 80° C. with mechanical stirring for about 12 hours.

16. The method of claim 12, comprising:
    centrifuging the heated slurry to isolate a white precipitate;
    drying the white precipitate at about 80° C. to obtain a dried white precipitate; and
    calcining the dried white precipitate at about 500° C. for about 2 hours to obtain the $TiO_2$ nanoparticles.

17. A method of preventing biofilm formation in wastewater systems, comprising:
    the method of making the carboxymethyl cellulose hydrogel loaded with $TiO_2$ nanoparticles of claim 1; and
    administering the carboxymethyl cellulose hydrogel loaded with $TiO_2$ nanoparticles to a wastewater system at a concentration between about 5 mg/mL and about 45 mg/mL.

18. A method of disinfecting wastewater, comprising:
    the method of making the carboxymethyl cellulose hydrogel loaded with $TiO_2$ nanoparticles of claim 1; and
    administering the carboxymethyl cellulose hydrogel loaded with $TiO_2$ nanoparticles to wastewater at a concentration of about 2 times minimum inhibitory concentration (2×MIC) for a contaminant.

* * * * *